US011264847B2

(12) United States Patent
Ishikawa

(10) Patent No.: US 11,264,847 B2
(45) Date of Patent: Mar. 1, 2022

(54) RELUCTANCE MOTOR, COMPRESSOR, AND AIR CONDITIONER

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 16/603,374

(22) PCT Filed: Jun. 2, 2017

(86) PCT No.: PCT/JP2017/020536
§ 371 (c)(1),
(2) Date: Oct. 7, 2019

(87) PCT Pub. No.: WO2018/220806
PCT Pub. Date: Dec. 6, 2018

(65) Prior Publication Data
US 2020/0328636 A1    Oct. 15, 2020

(51) Int. Cl.
*H02K 1/20*      (2006.01)
*H02K 1/24*      (2006.01)
(Continued)

(52) U.S. Cl.
CPC .............. *H02K 1/20* (2013.01); *F25B 13/00* (2013.01); *F25B 31/026* (2013.01); *H02K 1/246* (2013.01); *H02K 1/325* (2013.01); *H02K 19/103* (2013.01)

(58) Field of Classification Search
CPC ............ H02K 1/16; H02K 1/165; H02K 1/22; H02K 1/24; H02K 1/246; H02K 1/27;
(Continued)

(56) References Cited

U.S. PATENT DOCUMENTS 6,140,735 A * 10/2000 Kato .................... H02K 1/16
310/201
6,147,428 A    11/2000 Takezawa et al.
(Continued)

FOREIGN PATENT DOCUMENTS

JP    H10-290541 A    10/1998
JP    2002-153029 A    5/2002
(Continued)

OTHER PUBLICATIONS

International Search Report of the International Searching Authority dated Aug. 8, 2017 for the corresponding International application No. PCT/JP2017/020536 (and English translation).
(Continued)

*Primary Examiner* — Tran N Nguyen
(74) *Attorney, Agent, or Firm* — Posz Law Group, PLC

(57) ABSTRACT

A reluctance motor is used in a compressor. The reluctance motor includes a rotor having a rotor core that has an annular outer circumference about an axis, having a plurality of magnetic poles along the outer circumference, and having no permanent magnet, and a stator including a stator core that surrounds the rotor from an outer side in a radial direction about the axis and a winding wound around the stator core in wave winding. Each of the plurality of magnetic poles has a first slit formed in the rotor core and a second slit formed on an inner side of the first slit in the radial direction. The stator core has a refrigerant passage through which refrigerant passes in a direction of the axis.

14 Claims, 19 Drawing Sheets

(51) Int. Cl.
  *F25B 13/00* (2006.01)
  *F25B 31/02* (2006.01)
  *H02K 1/32* (2006.01)
  *H02K 19/10* (2006.01)

(58) Field of Classification Search
  CPC ........ H02K 1/276; H02K 1/2766; H02K 1/28; H02K 19/00; H02K 19/10; H02K 19/103; H02P 21/00; H02P 21/14; H02P 21/141
  See application file for complete search history.

(56) References Cited

U.S. PATENT DOCUMENTS

| | | | |
|---|---|---|---|
| 6,189,322 B1 * | 2/2001 | Ishihara | C09K 5/041 62/114 |
| 2008/0211340 A1 * | 9/2008 | Lee | H02K 1/246 310/216.004 |
| 2011/0081263 A1 * | 4/2011 | Yoshino | F04C 23/008 417/410.1 |
| 2012/0027632 A1 * | 2/2012 | Nemit, Jr. | F04C 28/26 417/440 |
| 2015/0236574 A1 | 8/2015 | Ono | |
| 2016/0329787 A1 | 11/2016 | Ito et al. | |
| 2017/0047802 A1 | 2/2017 | Yabe et al. | |

FOREIGN PATENT DOCUMENTS

| | | | | |
|---|---|---|---|---|
| JP | 2004-088852 A | | 3/2004 | |
| JP | 2006121821 | * | 5/2006 | ............ H02K 19/10 |
| JP | 2009-077480 A | | 4/2009 | |
| JP | 2010-075011 A | | 4/2010 | |
| JP | 2011-083066 A | | 4/2011 | |
| JP | 2011-147255 A | | 7/2011 | |
| JP | 2011-147259 A | | 7/2011 | |
| JP | 2013-192359 A | | 9/2013 | |
| JP | 2015-156756 A | | 8/2015 | |
| WO | 2015/132991 A1 | | 9/2015 | |
| WO | 2016/002012 A1 | | 1/2016 | |

OTHER PUBLICATIONS

Extended European Search Report dated Apr. 24, 2020 issued in corresponding EP patent application No. 17911412.9.
Office Action dated Apr. 28, 2020 issued in corresponding JP patent application No. 2019-521886 (and English translation).

* cited by examiner

RELUCTANCE MOTOR, COMPRESSOR, AND AIR CONDITIONER

CROSS REFERENCE TO RELATED APPLICATION

This application is a U.S. national stage application of International Patent Application No. PCT/JP2017/020536 filed on Jun. 2, 2017, the disclosure of which is incorporated herein by reference.

TECHNICAL FIELD

The present invention relates to a reluctance motor, and a compressor and an air conditioner in each of which the reluctance motor is used.

BACKGROUND

A reluctance motor (more specifically, a synchronous reluctance motor) has been conventionally developed in order to reduce power consumption and reduce manufacturing cost. The reluctance motor does not include a permanent magnet, but includes a slit formed in a magnetic pole of a rotor, so that a driving force is obtained by means of reluctance torque.

For example, Patent References 1 and 2 disclose techniques in which a permanent magnet is auxiliarily attached to a rotor of a reluctance motor to thereby enhance a motor output or the like.

Patent Reference 3 discloses a technique in which a rotor of a reluctance motor is divided into a permanent magnet rotor part and a reluctance rotor part to thereby suppress reduction in reluctance torque due to magnetic saturation.

PATENT REFERENCE

Patent Reference 1: Japanese Patent Application Publication No. 2013-192359 (see FIG. 2)
Patent Reference 2: Japanese Patent Application Publication No. 2011-83066 (see FIG. 1)
Patent Reference 3: Japanese Patent Application Publication No. 2004-88852 (see FIG. 2)

In order to reduce manufacturing cost of a reluctance motor, it is desirable not to use a permanent magnet. However, in order to obtain high torque only by reluctance torque, it is necessary to increase a size of a reluctance motor. It is difficult to accommodate such a reluctance motor in a limited space inside a compressor.

Moreover, in a compressor in which refrigerant flows in an axial direction through a through hole (a wind hole) or the like formed in a rotor, it is necessary to increase a flow rate of the refrigerant with an increase in torque.

SUMMARY

The present invention is made to solve the above problems, and an object of the present invention is to provide a reluctance motor that can be accommodated in a limited space in a compressor, can generate high torque, and can provide a sufficient flow rate of refrigerant.

A reluctance motor of the present invention is used in a compressor. The reluctance motor includes a rotor having a rotor core that has an annular outer circumference about an axis, having a plurality of magnetic poles along the outer circumference, and having no permanent magnet, and a stator having a stator core surrounding the rotor from an outer side in a radial direction about the axis and a winding wound around the stator core in wave winding. Each of the plurality of magnetic poles has a first slit formed in the rotor core and a second slit formed on an inner side of the first slit in the radial direction. The stator core has a refrigerant passage through which refrigerant passes in a direction of the axis.

In the present invention, since the winding is wound in wave winding, coil end parts can be made small. Therefore, the rotor core and the stator core can be made large in the direction of the axis without making the reluctance motor entirely large, and thus high torque can be obtained. Moreover, since the refrigerant passage is provided in the stator core, a flow rate of the refrigerant in the compressor can be increased.

DETAILED DESCRIPTION

First Embodiment (Configuration of Motor)

Figure 1:
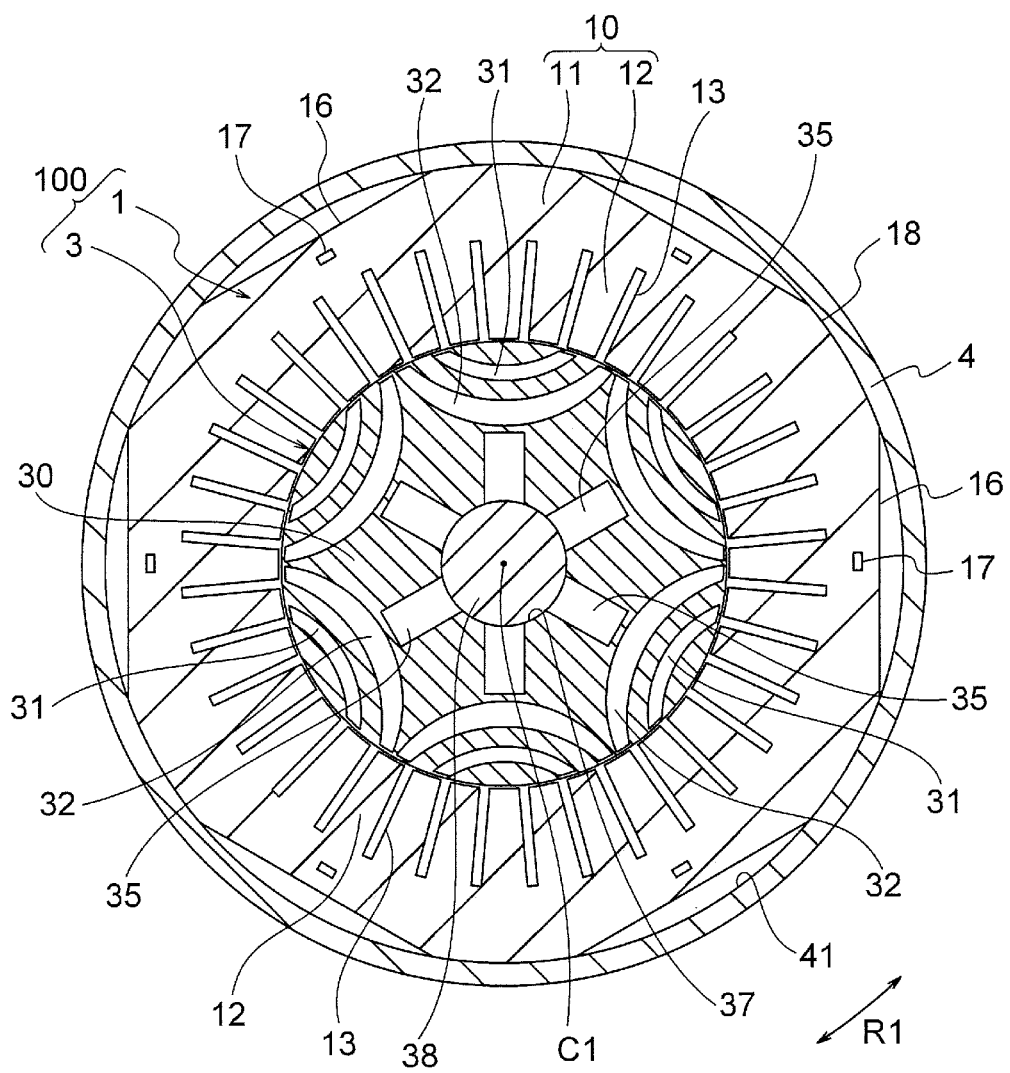
FIG. 1 is a sectional view illustrating a motor (a reluctance motor) of a first embodiment.

A first embodiment of the present invention will be described. FIG. 1 is a sectional view illustrating a motor 100 of the first embodiment. The motor 100 is a brushless DC motor and is used in a compressor 500 (FIG. 20) described later. Moreover, the motor 100 is a reluctance motor (more specifically, a synchronous reluctance motor) that generates a driving force by reluctance torque without using a permanent magnet.

The motor 100 includes a stator 1 and a rotor 3 rotatably provided on an inner side of the stator 1. An air gap is formed between the stator 1 and the rotor 3. The stator 1 is incorporated on an inner circumferential surface 41 side of a cylindrical shell 4 of the compressor 500.

The rotor 3 includes a cylindrical rotor core 30. The rotor core 30 includes stacking steel sheets (electromagnetic steel sheets) each having a thickness of 0.25 to 0.5 mm, for example, which are stacked in a direction of a rotation axis and are fixed by crimping or the like. A circular shaft hole 37 is formed at a center of the rotor core 30 in a radial direction. A shaft 38 that is a rotation shaft is fixed to the shaft hole 37 by press fitting. An axis C1 that is a center axis of the shaft 38 defines the rotation axis of the rotor 3.

Hereinafter, a direction of the axis C1 of the shaft 38 is referred to as an "axial direction". A direction of a circumference about the axis C1 (indicated by an arrow R1 in FIG. 1 and the like) is referred to as a "circumferential direction". A direction of a radius about the axis C1 is referred to as a "radial direction".

(Configuration of Rotor)

Figure 2:
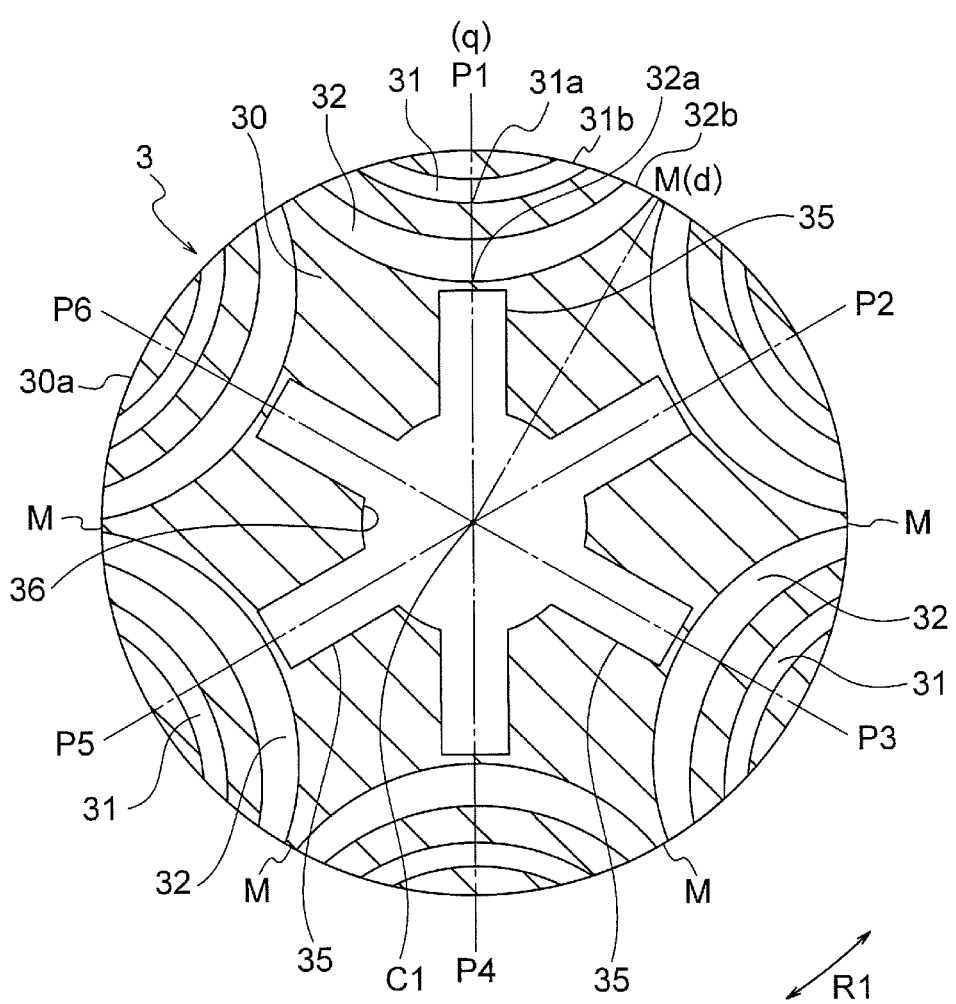
FIG. 2 is a sectional view illustrating a rotor of the motor of the first embodiment.

FIG. 2 is a sectional view illustrating the rotor 3. The rotor 3 has an annular outer circumferential surface 30a (an outer circumference) extending in the circumferential direction, and has six magnetic poles in the circumferential direction. In other words, the pole number P of the rotor 3 is six. In FIG. 2, the six magnetic poles are indicated by marks P1, P2, P3, P4, P5, and P6. However, the pole number P is not limited to six, and it is sufficient that the pole number P is two or more. A center position of each magnetic pole in the circumferential direction is a pole center. A part between magnetic poles adjacent to each other in the circumferential direction is an inter-pole part (indicated by mark M in FIG. 2).

First slits 31 are formed along the outer circumference of the rotor core 30. Second slits 32 are formed on inner sides of the respective first slits 31 in the radial direction. The first slit 31 and the second slit 32 correspond to one magnetic pole. In other words, each of the six magnetic poles has the first slit 31 and the second slit 32. The first slit 31 and the second slit 32 are also referred to as a flux barrier.

Each first slit 31 has an arc shape such that a center part 31a in the circumferential direction protrudes inward in the radial direction with respect to both end parts 32b in the circumferential direction. Similarly, each second slit 32 has an arc shape such that a center part 32a in the circumferential direction protrudes inward in the radial direction with respect to both ends 32b in the circumferential direction.

In a cross-section perpendicular to the axis C1 illustrated in FIG. 2, the center part 31a of the first slit 31 and the center part 32a of the second slit 32 are located on the same axis (an axis in the radial direction) passing through the axis C1. This axis corresponds to a q-axis (that is, a center line of a magnetic pole). Meanwhile, an axis in the radial direction passing through between the magnetic poles adjacent to each other in the circumferential direction corresponds to a d-axis (that is, a center line of the inter-pole part).

Figure 3:
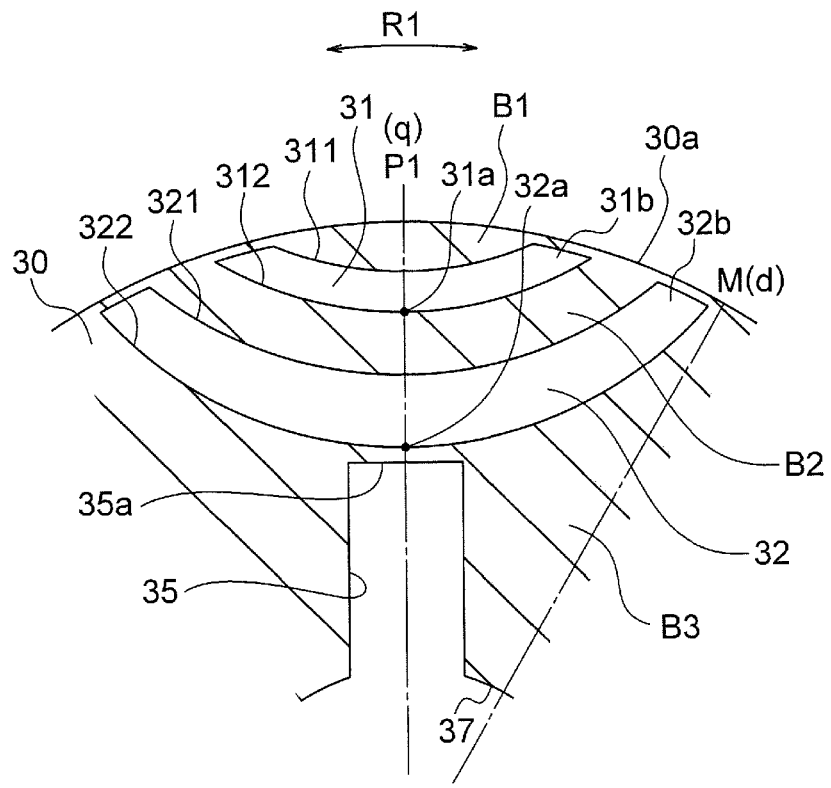
FIG. 3 is an enlarged diagram illustrating a part of the rotor of the motor of the first embodiment.

FIG. 3 is an enlarged diagram illustrating a part of the rotor core 30 including one magnetic pole. Each of the first slits 31 has an outer circumferential end side 311 having an arc shape and an inner circumferential end side 312 having an arc shape. A region B1 in which magnetic flux from the stator 1 flows is formed between the first slit 31 and the outer circumferential surface 30a of the rotor core 30 (more specifically, between the outer circumferential end side 311 of the first slit 31 and the outer circumferential surface 30a of the rotor core 30).

Each of the second slits 32 has an outer circumferential end side 321 having an arc shape and an inner circumferential end side 322 having an arc shape. A region B2 in which magnetic flux from the stator 1 flows is formed between the first slit 31 and the second slit 32 (more specifically, between the inner circumferential end side 312 of the first slit 31 and the outer circumferential end side 321 of the second slit 32).

Moreover, an inner circumferential side region B3 in which less magnetic flux from the stator 1 flows is formed in a region surrounded by the second slits 32 of the six magnetic poles (more specifically, a region surrounded by the inner circumferential end sides 312 of the second slits 32).

The first slit 31 and the second slit 32 of the rotor core 30 generate a difference between d-axis inductance Ld and q-axis inductance Lq, so that reluctance torque is generated.

Moreover, an outer circumferential bridge that is a thin wall part is formed between the end part 31b of the first slit 31 and the outer circumferential surface 30a of the rotor core 30. Similarly, an outer circumferential bridge that is a thin wall part is formed between the end part 32b of the second slit 32 and the outer circumferential surface 30a of the rotor core 30. A thickness of each outer circumferential bridge is the same as a thickness of each stacking steel sheet, for example.

The circular shaft hole 37 is formed at the center of the rotor core 30 in the radial direction, and the shaft 38 (FIG. 2) is fitted to the shaft hole 37. Groove parts 35 are formed to extend outward in the radial direction from an outer circumferential surface of the shaft hole 37. Each groove part 35 passes through the rotor core 30 in the axial direction. An outer end part 35a of the groove part 35 in the radial direction is close to the center part 32a of the second slit 32. The shortest distance between the end part 35a of the groove part 35 and the second slit 32 is the same as the thickness of each stacking steel sheet, for example.

With reference to FIG. 2 again, the groove parts 35 of the same number as the pole number P are formed in the rotor core 30 in a radial pattern. Since the pole number P is six in this example, six groove parts 35 are formed. Moreover, a position of each groove part 35 in the circumferential direction corresponds to each magnetic pole. A center line of each groove part 35 (a line in the radial direction which defines a center of the groove part 35 in the circumferential direction) is aligned with the center line of the magnetic pole.

Even in a state where the shaft 38 (FIG. 1) is fitted into the shaft hole 37, the groove parts 35 are not closed. Therefore, refrigerant flows in the axial direction through the inside of the groove parts 35. The groove parts 35 constitute refrigerant passages through which refrigerant passes. Although the groove parts 35 are formed continuously with the shaft hole 37, the groove parts 35 may be apart from the shaft hole 37 outward in the radial direction. Moreover, the number of the groove parts 35 is not limited to the same number as the pole number P, and it is sufficient that the number of the groove parts 35 is one or more.

(Configuration of Stator)

With reference to FIG. 1 again, the stator 1 includes a stator core 10 and a winding 2 (FIG. 5) wound around the stator core 10 in wave winding. The stator core 10 is obtained by stacking a plurality of stacking steel sheets (electromagnetic steel sheets) each having a thickness of 0.25 to 0.5 mm, for example, in the axial direction and fixing the sheets by crimping parts 17.

The stator core 10 includes an annular yoke part 11 that extends in the circumferential direction and a plurality of teeth 12 extending inward in the radial direction from the yoke part 11. A slot 13 is formed between each two teeth 12 adjacent to each other in the circumferential direction. The slots 13 are parts for accommodating the winding 2 wound around the teeth 12, and extend in the radial direction.

The number of the teeth 12 and the number of the slots 13 (referred to as the slot number S) are the same as each other, and are thirty-six in the example illustrated in FIG. 1. That is, six slots 13 correspond to each magnetic pole of the rotor 3. In three-phase distributed winding, the slot number S is 3n (n is a natural number) times the pole number P. Therefore, a ratio S/P of the slot number S to the pole number P is 3, 6, 9, 12, and 15, for example.

Cutout parts 16 are formed on an outer circumferential surface 18 of the stator core 10. Each cutout part 16 is formed by cutting the cylindrical outer circumferential surface 18 by a plane parallel to the axis C1, and extends over the entire region of the stator core 10 in the axial direction. The cutout parts 16 are formed at a plurality of positions in the circumferential direction in the yoke part 11. In this example, six cutout parts 16, the number of which is the same as the pole number P, are arranged at equal intervals in the circumferential direction. A refrigerant passage through which refrigerant passes in the axial direction is formed between the cutout part 16 and the inner circumferential surface 41 of the shell 4.

Moreover, the crimping parts 17 for fixing the stacking steel sheets of the stator core 10 to each other are formed in the yoke part 11. A reason why the crimping parts 17 are not formed in the teeth 12 but formed in the yoke part 11 is to prevent the crimping parts 17 from obstructing a flow of magnetic flux. In this example, six crimping parts 17, the number of which is the same as the pole number P, are arranged at equal intervals in the circumferential direction. The crimping parts 17 are formed at positions corresponding to center parts of the cutout parts 16 in the circumferential direction.

Figure 4:
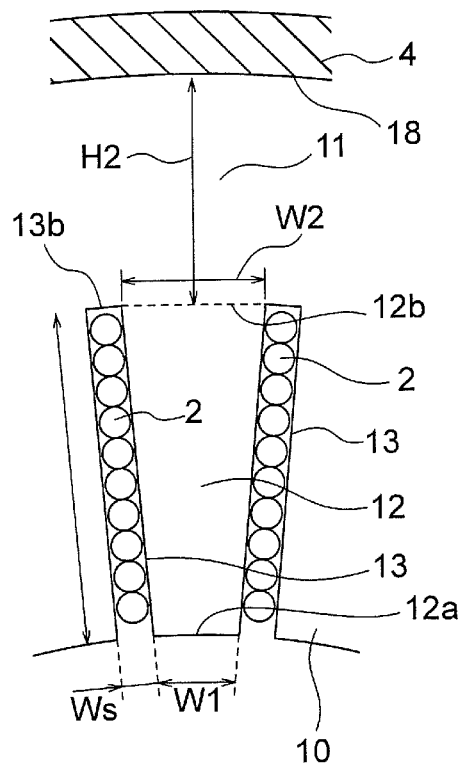
FIG. 4 is an enlarged schematic diagram illustrating a tooth and its surrounding part of the motor of the first embodiment.

FIG. 4 is an enlarged schematic diagram illustrating a part of the stator 1. A width (a length in the circumferential direction) of each tooth 12 decreases toward the tip 12a of the tooth 12. That is, a width W1 of the tooth 12 at the tip 12a (an inner end in the radial direction) is narrower than a width W2 of the tooth 12 at its base 12b (an outer end in the radial direction).

A length of the tooth 12 in the radial direction (that is, a distance from the base 12b to the tip 12a) is represented by H1. H1 is also a length of each slot 13. Moreover, a distance from the base 12b of the tooth 12 to the outer circumferential surface 18 of the yoke part 11 (a yoke width) is represented by H2. The yoke width H2 is a width of a magnetic path that flows in the yoke part 11 in the circumferential direction.

Winding parts of the winding 2 are arranged in a row in each slot 13. A width Ws of the slot 13 in the circumferential direction is set to such a width that the winding parts of the winding 2 are arranged in a row. That is, the slot 13 has a rectangular shape having the width Ws in the circumferential direction and the length H1 in the radial direction. An inner end of the slot 13 in the radial direction is an opening 13a through which the winding parts of the winding 2 are inserted, and an outer end of the slot 13 in the radial direction is a closed end 13b.

(Configuration of Winding)

Figure 5:
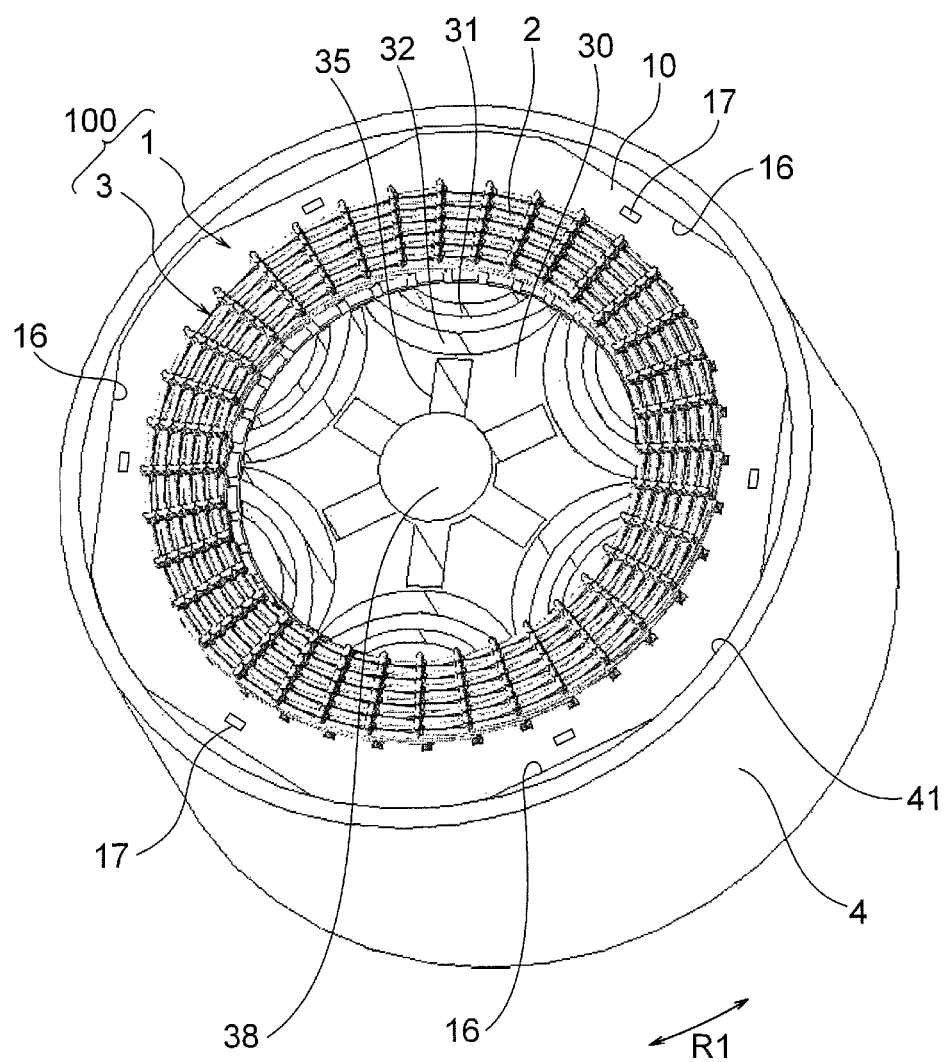
FIG. 5 is a perspective view illustrating the motor of the first embodiment.

Next, the winding 2 will be described. FIG. 5 is a perspective view illustrating the motor 100 in which the winding 2 is wound around the stator core 10. The winding 2 is wound around thirty-six teeth 12 (FIG. 1) of the stator core 10 in wave winding. Since the winding 2 is wound in wave winding, an outward protruding amount of the winding 2 in the radial direction from the teeth 12 is small. Therefore, the winding 2 does not obstruct a flow of refrigerant passing through the cutout parts 16.

Moreover, since the winding 2 is wound in wave winding, a protruding amount of the winding 2 in the axial direction from the stator core 10 is also small, as compared with a case where the winding 2 is wound in concentric winding. As the protruding amount of the winding 2 in the axial direction is small, the lengths of the stator core 10 and the rotor core 30 in the axial direction can be increased. Moreover, in the entire length of the winding 2, lengths of parts (parts inserted into the slots 13) other than coil end parts can be increased, and thus higher torque can be obtained.

The winding 2 is a conductor (for example, copper) on which a corrosion-resistant cover layer such as a cover layer of polyesterimide or polyamideimide is formed. This is because the winding 2 is in contact with refrigerant that circulates in the compressor 500 in which the motor 100 is provided.

Figure 6:
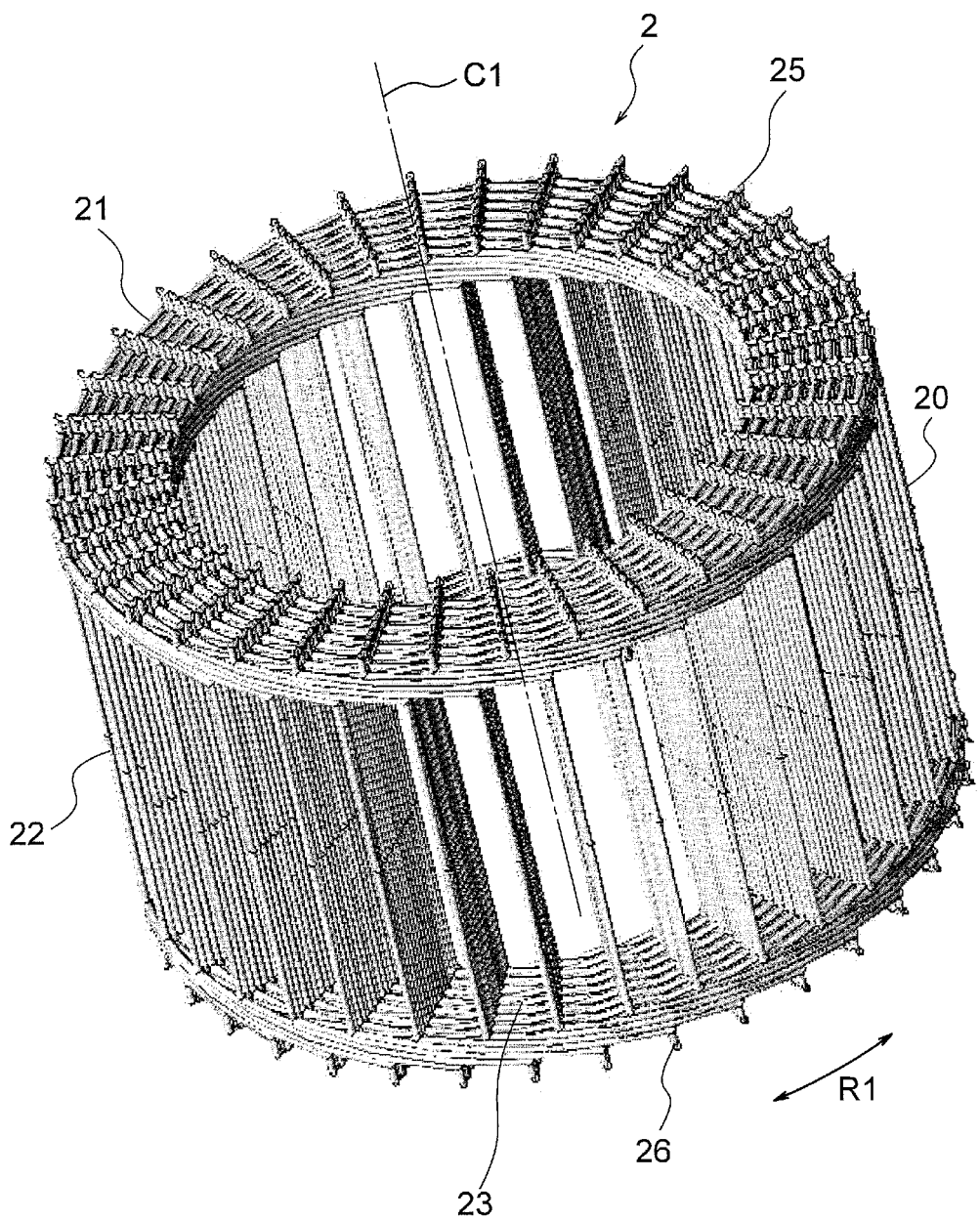
FIG. 6 is a perspective view illustrating a winding of the first embodiment.

FIG. 6 is a schematic diagram illustrating the winding 2 wound in wave winding. The winding 2 has a straight part 22 inserted in the slots 13 (FIG. 1), a coil end part 21 extending in the circumferential direction on one end surface of the rotor core 30 in the axial direction, and a coil end part 23 extending in the circumferential direction on the other end surface of the rotor core 30 in the axial direction. In this example, eight winding parts 20 of the winding 2 are inserted in each slot 13 (FIG. 1).

Figure 7:
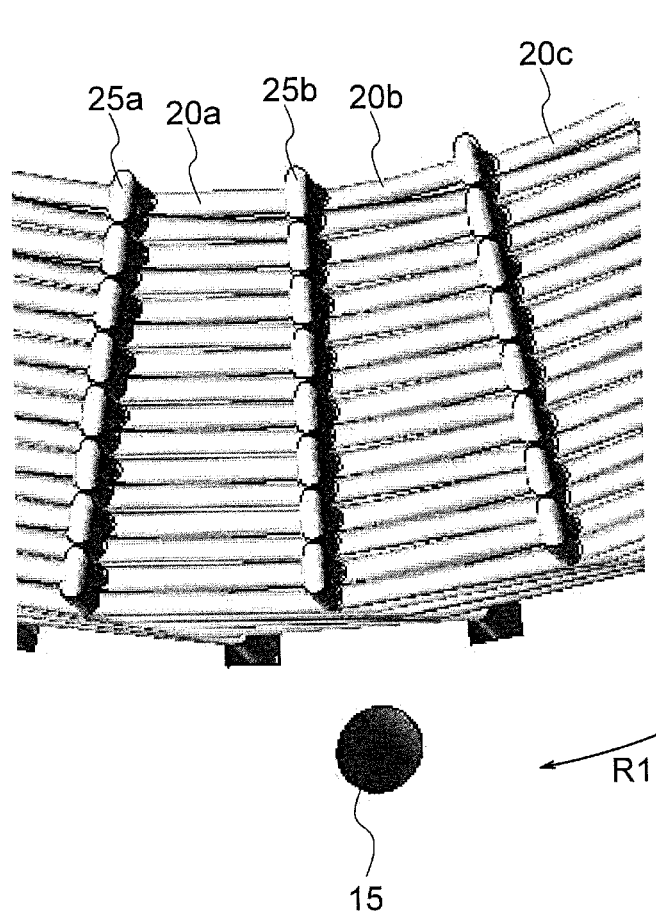
FIG. 7 is an enlarged schematic diagram illustrating a part of the winding of the first embodiment.

FIG. 7 is an enlarged diagram illustrating a part of the coil end part 21 of the winding 2. In the coil end part 21, nine winding parts 20 are wound at the same winding position in the radial direction (for example, an innermost position) in such a manner that positions of the winding parts 20 in the circumferential direction are shifted from each other by one slot. Three of the nine winding parts 20 wound at the innermost position are referred to as winding parts 20a, 20b, and 20c.

Figure 8:
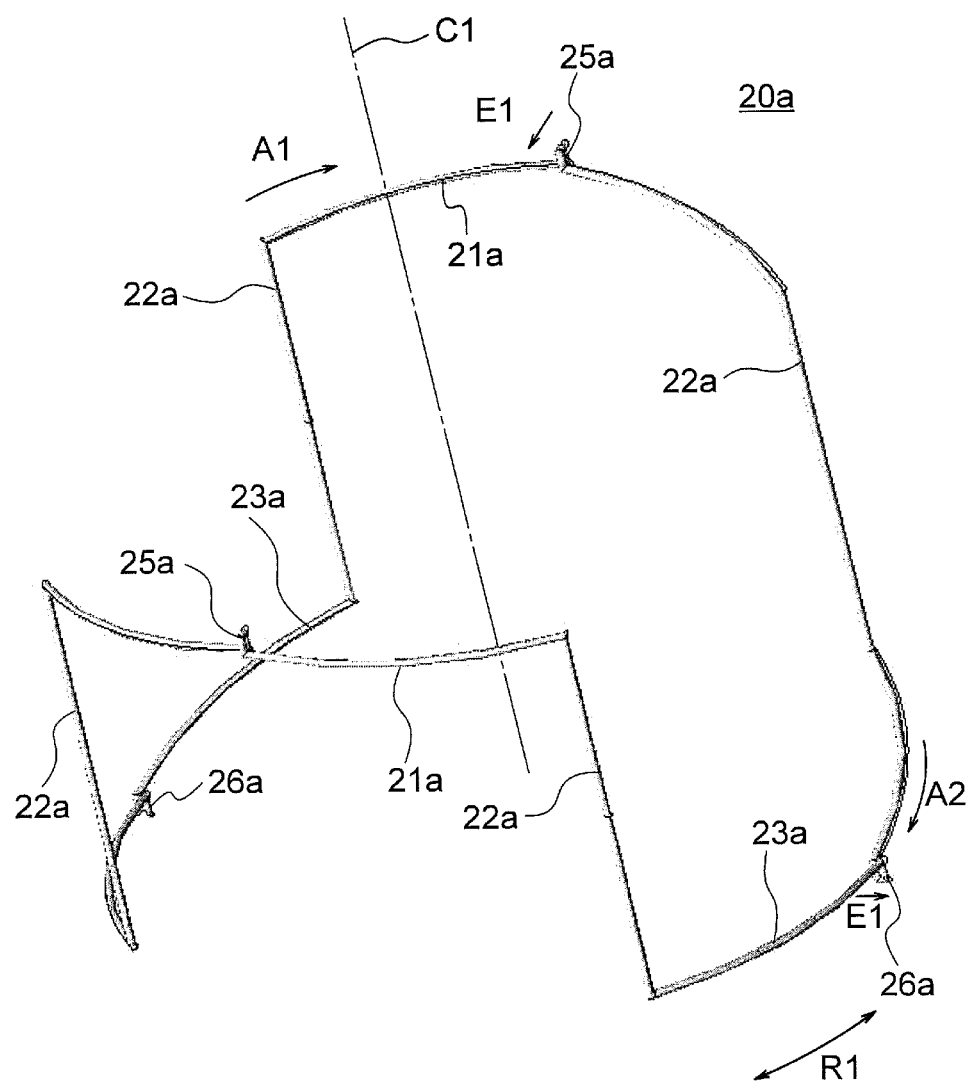
FIG. 8 is a perspective view illustrating one winding part of the winding of the first embodiment.

FIG. 8 is a schematic diagram illustrating one winding part 20a. The winding part 20a has two coil end parts 21a, four straight parts 22a, and two coil end parts 23a. The winding part 20a is wound so as to span nine teeth 12. That is, the straight parts 22a of the winding part 20a are inserted in every nine slots 13.

The coil end part 21a extends to connect ends of the straight parts 22a in the axial direction (upper ends in FIG. 8) to each other, and the coil end part 23a extends to connect the other ends of the straight parts 22a in the axial direction (lower ends in FIG. 8) to each other. The coil end parts 21a and the coil end parts 23a are alternately arranged in the circumferential direction about the axis C1.

A nose part 25a is provided at a center part of the coil end part 21a in the circumferential direction, and the coil end part 21*a* is displaced in the radial direction by a displacement amount E1 at the nose part 25*a*. The coil end part 21*a* extends clockwise in the circumferential direction about the axis C1 as indicated by an arrow A1 in FIG. 8, is displaced inward in the radial direction by the displacement amount E1 at the nose part 25*a*, and extends again in the direction indicated by the arrow A1.

A nose part 26*a* is provided at a center part of the coil end part 23*a* in the circumferential direction, and the coil end part 23*a* is displaced in the radial direction by the displacement amount E1 at the nose part 26*a*. The coil end part 23*a* extends clockwise in the circumferential direction about the axis C1 as indicated by an arrow A2 in FIG. 8, is displaced outward in the radial direction by the displacement amount E1 at the nose part 26*a*, and extends again in the direction indicated by the arrow A2.

Figure 9:
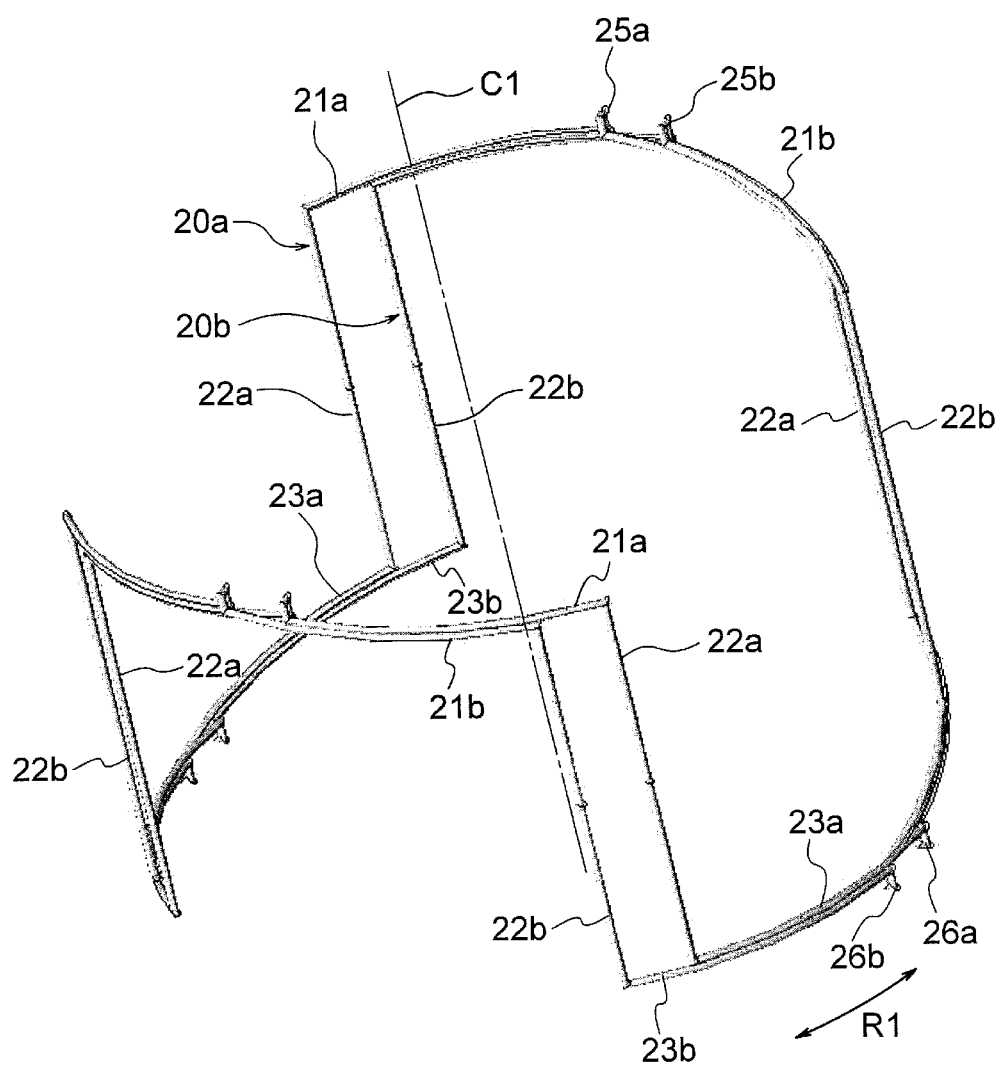
FIG. 9 is a perspective view illustrating two winding parts of the winding of the first embodiment.

FIG. 9 is a schematic diagram illustrating the two winding parts 20*a* and 20*b*. The winding part 20*b* has two coil end parts 21*b*, four straight parts 22*b*, and two coil end parts 23*b*, as is the case with the winding part 20*a*.

The straight part 22*b* of the winding part 20*b* is shifted clockwise about the axis C1 with respect to the straight part 22*a* of the winding part 20*a* by one slot. A nose part 25*b* is provided at a center part of the coil end part 21*b* in the circumferential direction, as is the case with the nose part 25*a* of the coil end part 21*a*. A nose part 26*b* is provided at a center part of the coil end part 23*b* in the circumferential direction, as is the case with the nose part 26*a* of the coil end part 23*a*.

The coil end parts 21*a* and 21*b* of the winding parts 20*a* and 20*b* extend in the circumferential direction while overlapping each other in the axial direction, and their vertical positions (positions in the axial direction) are inverted to each other through the nose parts 25*a* and 25*b*. Similarly, the coil end parts 23*a* and 23*b* of the winding parts 20*a* and 20*b* extend in the circumferential direction while overlapping each other in the axial direction, and their vertical positions (positions in the axial direction) are inverted to each other through the nose parts 26*a* and 26*b*. Therefore, the straight parts 22*a* and 22*b* of the winding parts 20*a* and 20*b* can be inserted in the slots 13 adjacent to each other (FIG. 1) without interfering with each other.

Although FIG. 9 illustrates the two winding parts 20*a* and 20*b* only, nine winding parts 20 in total including these winding parts 20*a* and 20*b* are wound at the same winding position (for example, at the innermost position) in the radial direction as the winding parts 20*a* and 20*b*. That is, the straight part 22 of the winding 20 is inserted in each of the thirty-six slots 13 of the stator core 10.

Figure 10:
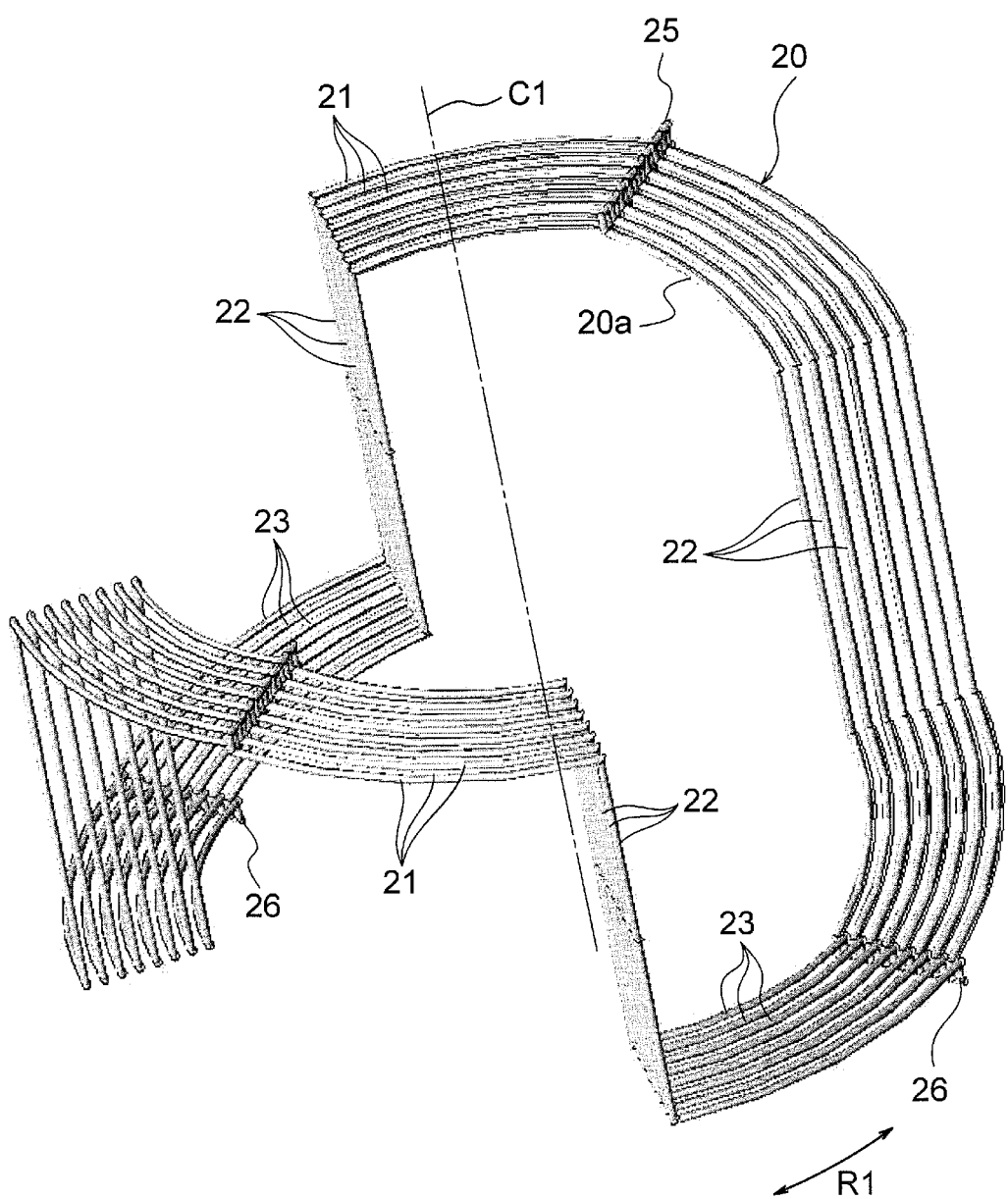
FIG. 10 is a perspective view illustrating winding parts inserted into the same slot of a stator of the first embodiment.

FIG. 10 is a schematic diagram illustrating eight winding parts 20 in total inserted in the same slots 13 in which the winding part 20*a* illustrated in FIG. 8 is inserted. The eight winding parts 20 are wound at equal intervals in the radial direction. By winding the winding 20 while shifting the winding parts 20 from each other by one slot in the circumferential direction (FIG. 9) and also winding the winding parts 20 in the radial direction as above, the winding 2 in wave winding illustrated in FIG. 6 is formed.

The number of the winding parts 20 inserted in each slot 13 and the number of the teeth 12 spanned by each winding part 20 are not limited to those in the example illustrated in FIGS. 6 to 10, and can be set to any numbers in accordance with the pole number P and the slot number S.

Figure 11:
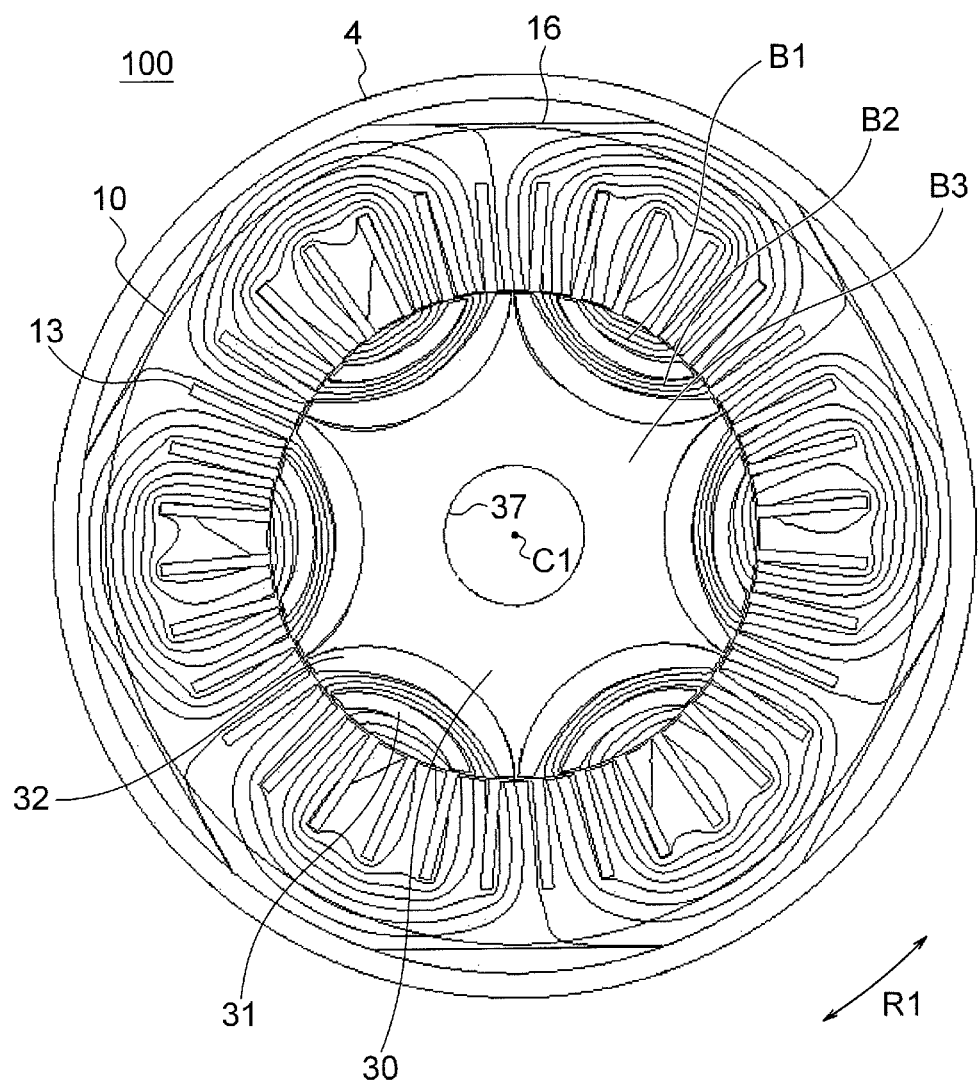
FIG. 11 is a diagram illustrating an analysis result of a magnetic flux distribution in the motor of the first embodiment in a case where no groove part is provided in the rotor.

FIG. 11 is a diagram illustrating an analysis result of a magnetic flux distribution in the motor 100 in the case where the groove part 35 is not provided in the rotor core 30. When a current is made to flow in the winding 2 (omitted in FIG. 11) in the slot 13 of the stator 1, magnetic flux generated by the winding current is distributed as illustrated in FIG. 11. In the rotor core 30, magnetic flux flows in the regions B1 on the outer circumferential side of the first slits 31 and the band-shaped regions B2 between the first slits 31 and the second slits 32. Meanwhile, magnetic flux flowing in the inner circumferential side region B3 surrounded by the second slits 32 of the six magnetic poles is little.

Figure 12:
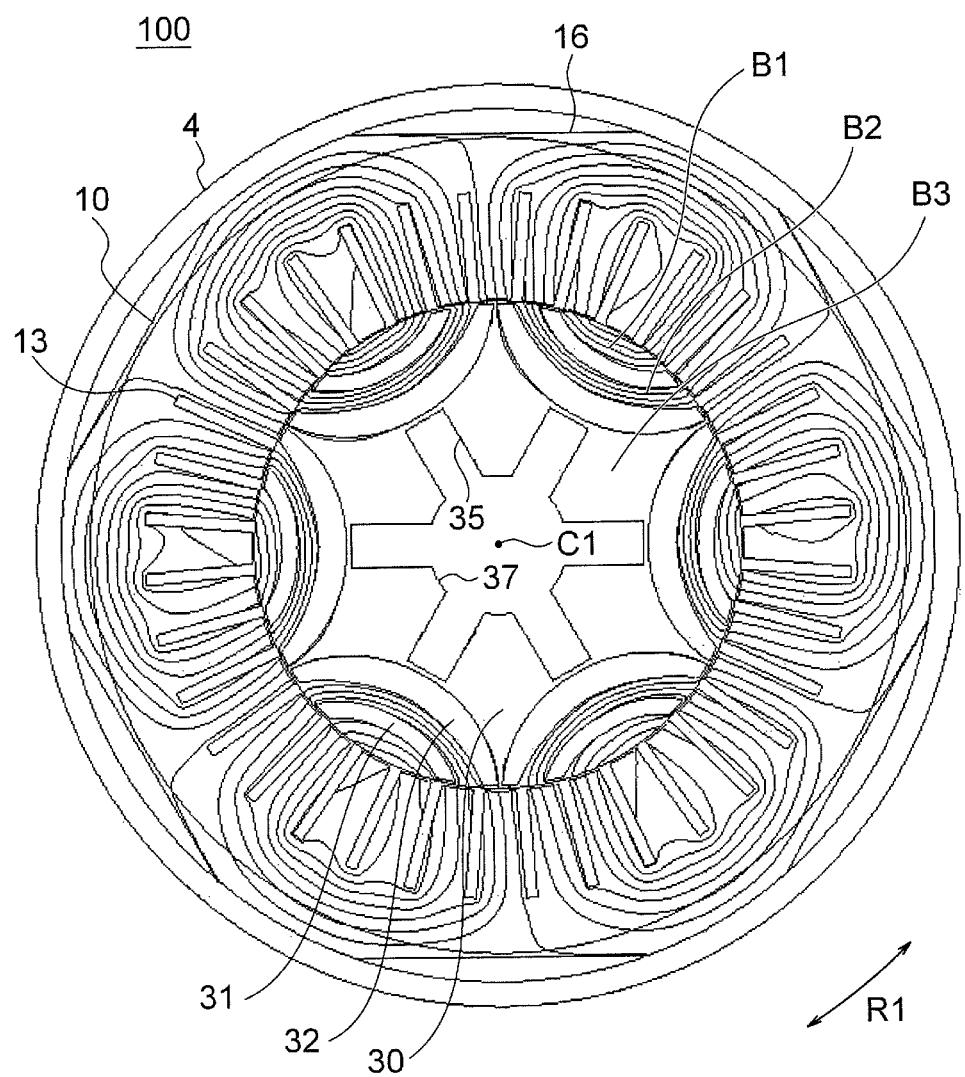
FIG. 12 is a diagram illustrating an analysis result of a magnetic flux distribution in the motor of the first embodiment in a case where a groove part is provided in the rotor.

FIG. 12 is a diagram illustrating an analysis result of a magnetic flux distribution in the motor 100 in the case where the groove part 35 is provided in the rotor core 30. The groove parts 35 are formed in the inner circumferential side region B3 of the rotor core 30, and little magnetic flux flows in the inner circumferential side region B3. Therefore, the groove parts 35 do not obstruct a flow of magnetic flux in the rotor core 30 and therefore do not affect magnetic characteristics of the motor 100.

COMPARATIVE EXAMPLE

Figure 13:
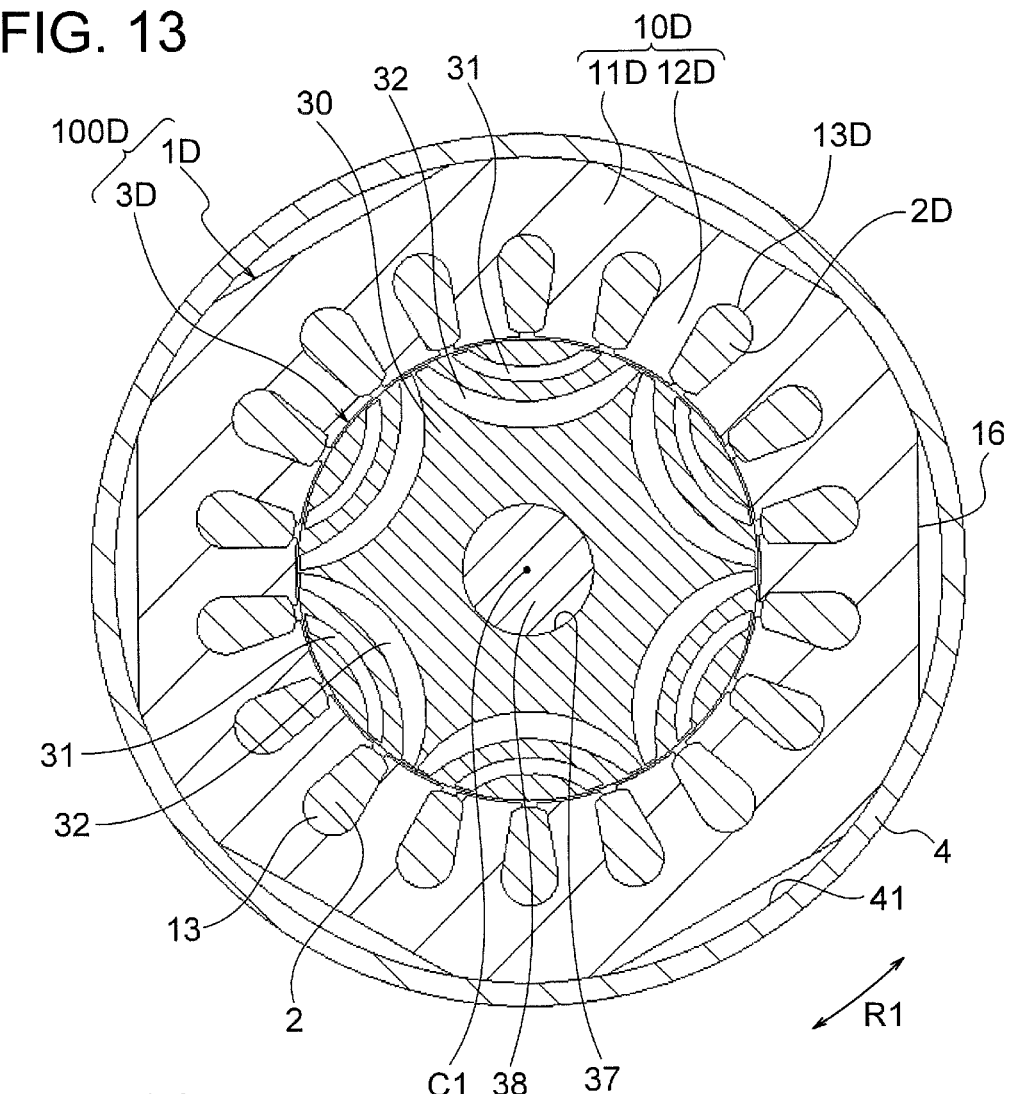
FIG. 13 is a sectional view illustrating a motor of a comparative example.

FIG. 13 is a sectional view illustrating a motor 100D of a comparative example in a cross-section perpendicular to the axis C1. The motor 100D of the comparative example includes a stator 1D and a rotor 3D. The stator 1D includes a stator core 10D and a winding 2D wound around the stator core 10D. The stator core 10D includes an annular yoke part 11D and eighteen teeth 12D protruding inward in the radial direction from the yoke part 11D. A slot 13D is formed between each two teeth 12D adjacent to each other in the circumferential direction. The winding 2D is wound around the teeth 12D in concentric winding. The rotor 3D has the same configuration as the rotor 3 of the first embodiment except that the rotor 3D is not provided with the groove part 35.

In the motor 100D of the comparative example, the winding 2D is wound in concentric winding, and thus coil end parts are large. Therefore, in order to accommodate the motor 100D in a limited space within a compressor, it is necessary to shorten lengths of the stator core 10D and the rotor core 30D in the axial direction.

(Enhancement in Motor Output)

Figure 14:
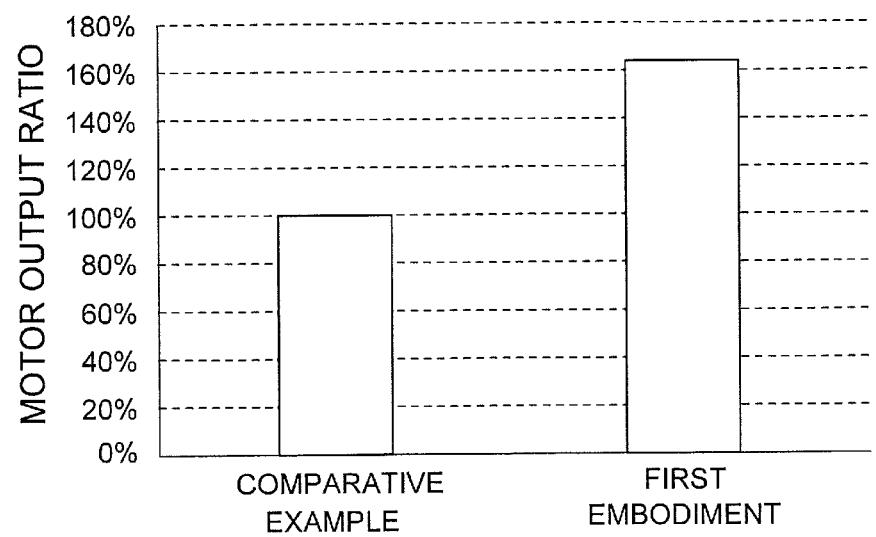
FIG. 14 is a graph illustrating in comparison a motor output in the first embodiment and a motor output in the comparative example.

Next, an effect of enhancing a motor output in the first embodiment will be described. FIG. 14 is a graph illustrating in comparison an output of the motor 100 of the first embodiment (FIG. 1) and an output of the motor 100D of comparative example (FIG. 13). Here, the motor output of the motor 100 of the first embodiment and that of the motor 100D of the comparative example are compared assuming that the motors have the same entire sizes (dimensions in the axial and radial directions).

The winding 2 wound in wave winding has smaller coil end parts than the winding 2 wound in concentric winding. Therefore, in the motor 100 of the first embodiment, it is possible to increase the lengths of the stator core 10 and the rotor core 30 in the axial direction, and to increase the length of the winding 2 inserted in the slots 13 (a length that contributes to generation of a driving force), in comparison with the motor 100D of the comparative example having the same size.

By increasing the lengths of the stator core 10 and the rotor core 30 in the axial direction and the length of the winding 2 that contributes to generation of a driving force as above, a torque constant can be increased. Therefore, when the same current is made to flow in the winding 2, the motor 100 of the first embodiment can generate a higher output than the motor 100D of the comparative example. The analysis result in FIG. 14 shows that the motor 100 of the first embodiment generates an output higher than the motor 100D of the comparative example by 60%.

As described above, the motor 100 of the first embodiment can generate a high output although the motor 100 is a reluctance motor having no permanent magnet.

Although two slits (the first slit 31 and the second slit 32) are formed in each magnetic pole in this example, three or more slits may be formed in each magnetic pole. In such a case, an outermost slit in each magnetic pole is referred to as the first slit, and an innermost slit is referred to as the second slit.

Advantages of Embodiment

As described above, the motor 100 of the first embodiment of the present invention is a reluctance motor having the first slit 31 and the second slit 32 in each magnetic pole of the rotor 3, the winding 2 is wound around the stator core 10 in wave winding, and the cutout parts 16 (refrigerant passages) through which refrigerant flows in the axial direction are formed in the stator core 10.

Since the winding 2 is wound in wave winding, the coil end parts are small. Therefore, it is possible to increase the lengths of the stator core 10 and the rotor core 30 in the axial direction and the length of the winding 2 that contributes to generation of a driving force, without increasing the entire size of the motor 100. As a result, a high output can be obtained even by a reluctance motor having no permanent magnet.

Moreover, the winding 2 is wound in wave winding and the outward protruding amount of the winding in the radial direction is small. Therefore, a flow of refrigerant passing through the cutout parts 16 is not obstructed by the winding 2, and thus a sufficient flow rate of refrigerant can be obtained. That is, it is possible to flow a sufficient amount of refrigerant in accordance with enhancement in output of the motor 100.

Further, since the groove parts 35 that pass through the rotor core 30 in the axial direction are formed on the outer side in the radial direction of the shaft hole 37 of the rotor core 30, it is possible to increase a flow rate of refrigerant without obstructing a flow of magnetic flux in the rotor core 30.

Furthermore, since the groove parts 35 are formed continuously with the shaft hole 37, it is easy to process the stacking steel sheets and it is possible to increase an area of the groove parts 35 (that is, an area of flow passages).

In addition, the slit 31 has an arc shape such that the center part 31a in the circumferential direction protrudes inward in the radial direction with respect to both end parts 31b, and the slit 32 has an arc shape such that the center part 32a in the circumferential direction protrudes inward in the radial direction with respect to both end parts 32b. Therefore, it is possible to make a difference between d-axis inductance Ld and q-axis inductance Lq and to thereby generate reluctance torque.

Second Embodiment

Figure 15:
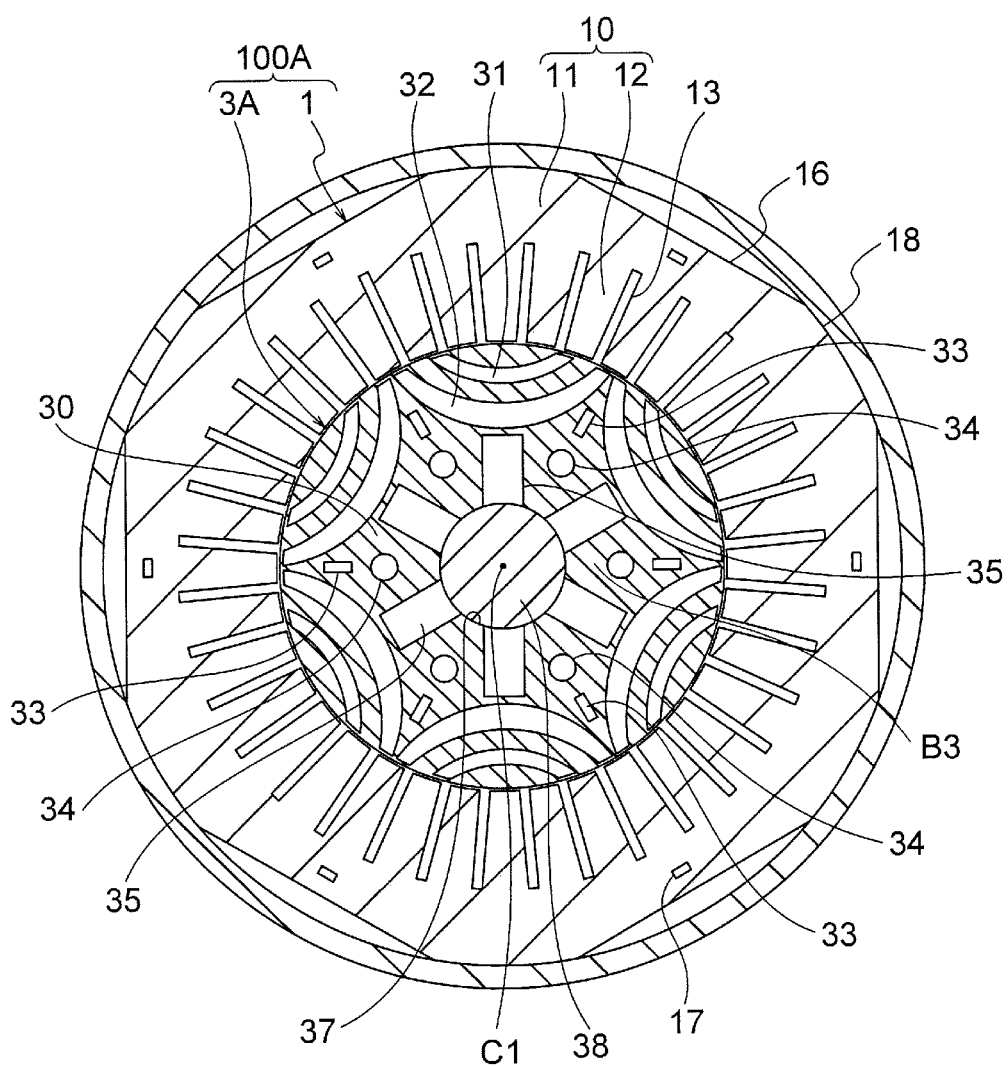
FIG. 15 is a sectional view illustrating a motor of a second embodiment.

Next, a second embodiment of the present invention will be described. FIG. 15 is a sectional view illustrating a configuration of a motor 100A of the second embodiment in a plane perpendicular to the axis C1. The motor 100A includes the stator 1 and a rotor 3A.

The stator 1 of the motor 100A has the same configuration as the stator 1 of the motor 100 of the first embodiment. That is, the stator core 10 of the stator 1 includes the yoke part 11 and the teeth 12, the winding 2 is wound around the teeth 12 in wave winding, and the cutout parts 16 (refrigerant passages) through which refrigerant flows in the axial direction are formed in the yoke part 11.

The rotor 3A of the motor 100A is obtained by providing crimping parts 33 and rivet holes (through holes) 34 in the rotor 3 of the motor 100 of the first embodiment. Both of the number of the crimping parts 33 and the number of the rivet holes 34 are the same as the pole number P. Since the pole number P is six in this example, both of the number of the crimping parts 33 and the number of the rivet holes 34 are six.

Figure 16:
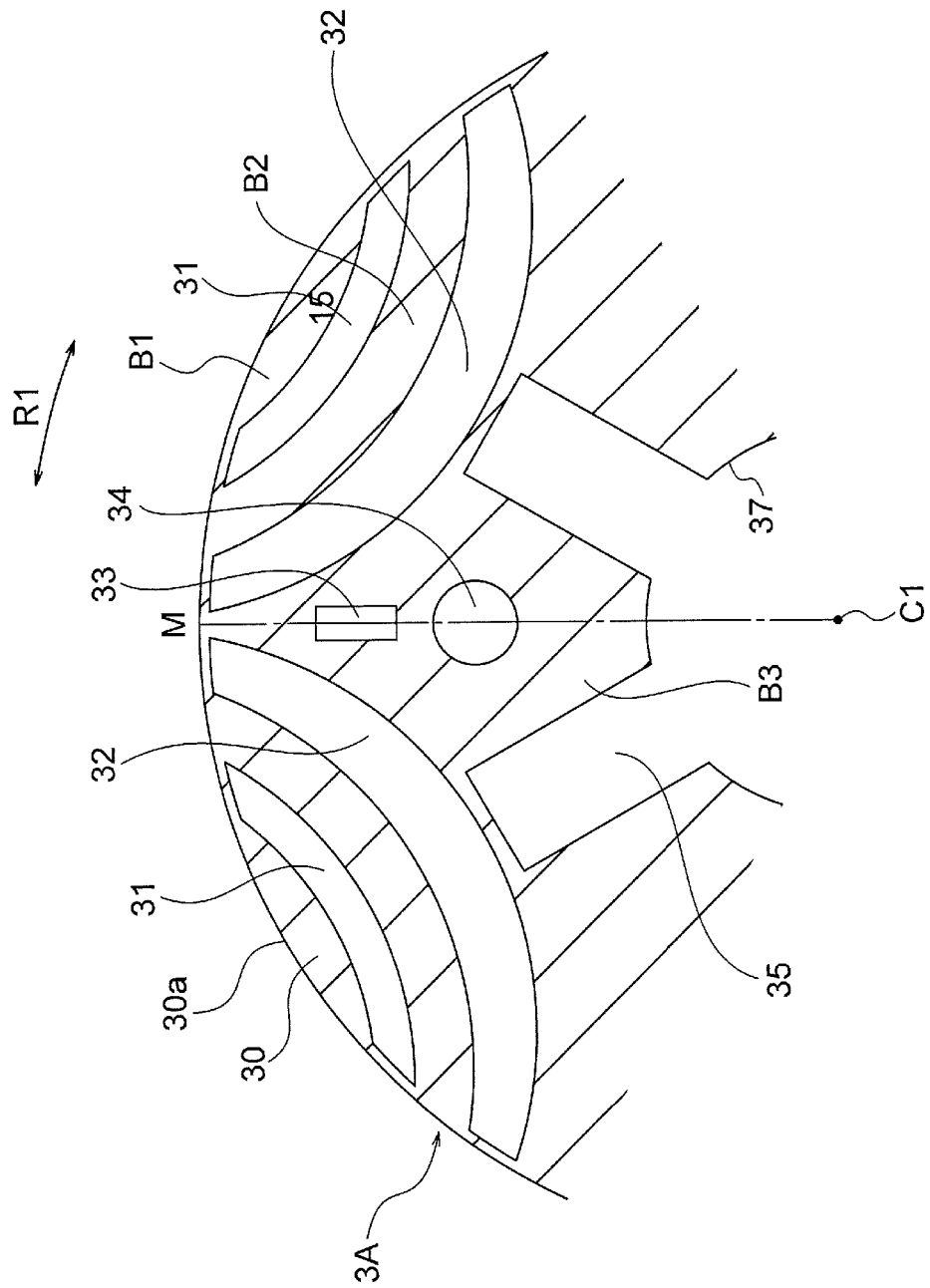
FIG. 16 is an enlarged view illustrating a part of a rotor of the motor of the second embodiment.

FIG. 16 is an enlarged view illustrating a part of the rotor 3A. The crimping parts 33 of the rotor 3A are provided for fixing stacking steel sheets of the rotor core 30 to each other. The crimping parts 33 are formed in the inner circumferential side region B3 surrounded by the second slits 32 of the magnetic poles in the rotor core 30. Moreover, the crimping parts 33 are formed in the inter-pole parts. More specifically, each crimping part 33 is formed at a position between two second slits 32 adjacent to each other in the circumferential direction.

The rivet holes 34 of the rotor 3A are formed in the inner circumferential side region B3 surrounded by the second slits 32 of the magnetic poles in the rotor core 30, as is the case with the crimping parts 33. Moreover, the rivet holes 34 are formed in the inter-pole parts and are located on the inner sides of the crimping parts 33 in the radial direction.

As described in the first embodiment, a flow of magnetic flux is little in the inner circumferential side region B3 surrounded by the second slits 32 of the magnetic poles in the rotor core 30. Therefore, the crimping parts 33 and the rivet holes 34 do not obstruct a flow of magnetic flux in the rotor core 30.

In addition, as compared with a permanent magnet embedded type motor, an area occupied by opening parts (the slits 31 and 32) in the rotor core 30 of the reluctance motor is larger, and thus a region where the crimping parts 33 can be formed is smaller. By forming the crimping parts 33 in the inter-pole parts, it is possible to effectively use a limited region in the rotor core 30.

Moreover, in the reluctance motor, no permanent magnet is inserted in the slits 31 and 32. Therefore, as compared with the permanent magnet embedded type motor, displacement of the stacking steel sheets is likely to occur during rotation of the rotor 3A. For this reason, it is necessary to securely fasten the stacking steel sheets using the crimping parts 33 and rivets. Further, the rivet holes 34 in which the rivets are inserted occupy a wider area than the crimping parts 33. Therefore, in the second embodiment, the rivet holes 34 are formed on the inner sides of the crimping parts 33 in the radial direction.

Furthermore, the crimping parts 33 and the rivet holes 34 are formed in all of the six inter-pole parts. Thus, a weight balance of the rotor core 30 in the circumferential direction is enhanced. Although the six crimping parts 33 and the six rivet holes 34 are formed in this example, it is sufficient that at least one crimping part 33 and at least one rivet hole 34 are formed.

In addition, although both of the crimping part 33 and the rivet hole 34 are formed in the rotor core 30 in this example, it is possible that only the crimping part 33 is formed in the rotor core 30 or only the rivet holes 34 is formed in the rotor core 30. Moreover, the rivet holes 34 may be used as through holes through which refrigerant passes in the axial direction.

Furthermore, although two slits (the first slit 31 and the second slit 32) are formed in each magnetic pole in this example, three or more slits may be formed. In such a case, it is sufficient that the crimping parts 33 and the rivet holes 34 are formed in a region surrounded by innermost slits (referred to as the second slits) of the magnetic poles.

As described above, in the second embodiment, the crimping parts 33 are formed in the inner circumferential side region B3 surrounded by the second slits 32 of the magnetic poles in the rotor core 30. Therefore, it is possible to form the crimping parts 33 so as not to obstruct a flow of magnetic flux in the rotor core 30, and thus the stacking elements of the rotor core 30 can be fixed strongly.

Moreover, the rivet holes (the through holes) 34 are formed on the inner sides of the crimping parts 33 in the radial direction. Therefore, it is possible to form the rivet holes 34 so as not to obstruct a flow of magnetic flux in the rotor core 30, and thus the stacking elements of the rotor core 30 can be fixed further strongly.

Furthermore, since the crimping parts 33 and the rivet holes 34 are formed in the inter-pole parts, it is possible to effectively use a limited space of the inner circumferential side region B3 of the rotor core 30. Since the crimping parts 33 and the rivet holes 34 are formed in all of the inter-pole parts, a weight balance of the rotor core 30 in the circumferential direction is enhanced.

Third Embodiment

Figure 17:
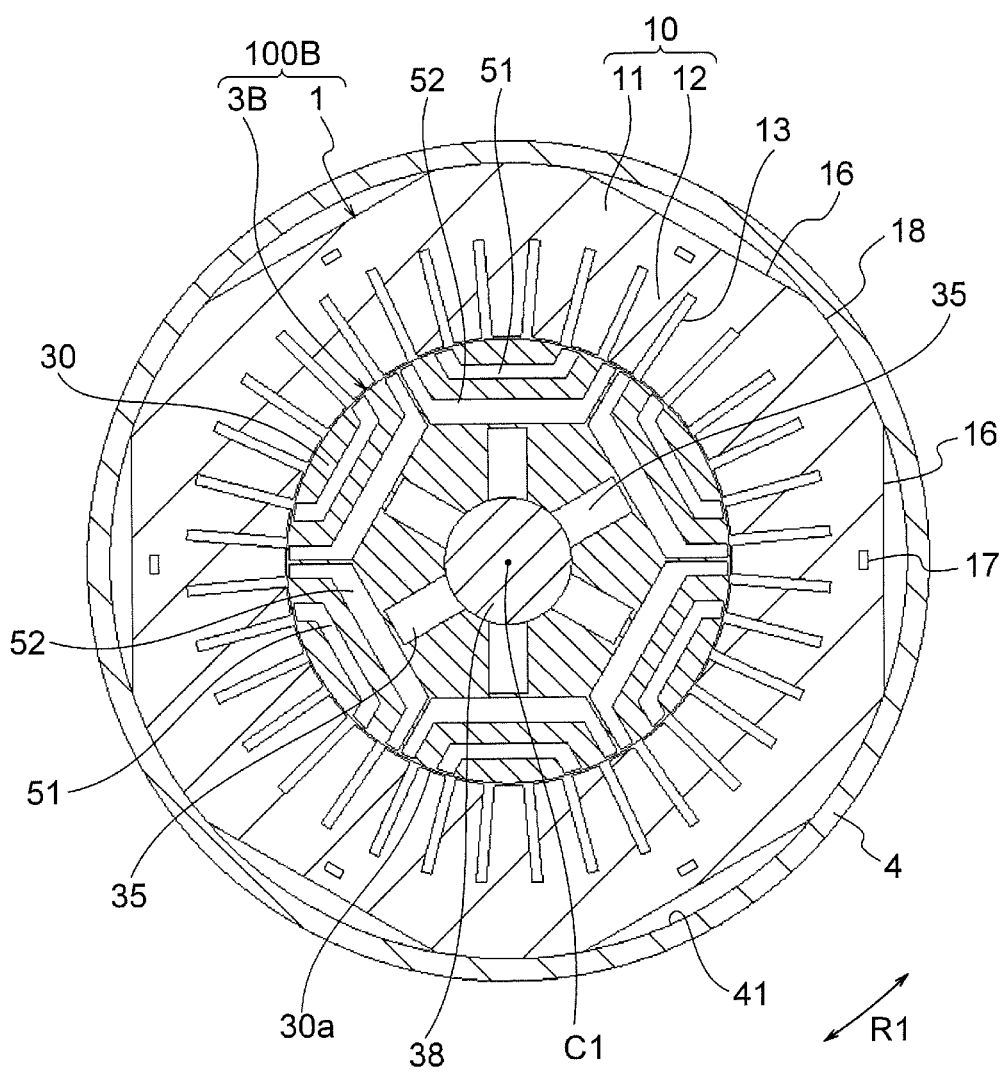
FIG. 17 is a sectional view illustrating a motor of a third embodiment.

Next, a third embodiment of the present invention will be described. FIG. 17 is a sectional view illustrating a configuration a motor 100B of the third embodiment in a plane perpendicular to the axis C1. The motor 100B includes the stator 1 and a rotor 3B.

The stator 1 of the motor 100B has the same configuration as the stator 1 of the motor 100 of the first embodiment. That is, the stator core 10 of the stator 1 includes the yoke part 11 and the teeth 12, the winding 2 is wound around the teeth 12 in wave winding, and the cutout parts 16 (refrigerant passages) through which refrigerant flows in the axial direction are formed in the yoke part 11.

The rotor 3B of the motor 100B is different from the rotor 3 of the motor 100 of the first embodiment in the shape of slits. The rotor 3B of the third embodiment has first slits 51 formed along the outer circumferential surface 30a of the rotor core 30 and second slits 52 formed on inner sides of the respective first slits 51 in the radial direction. The first slit 51 and the second slit 52 correspond to one magnetic pole. In other words, each of the six magnetic poles has the first slit 51 and the second slit 52.

Figure 18:
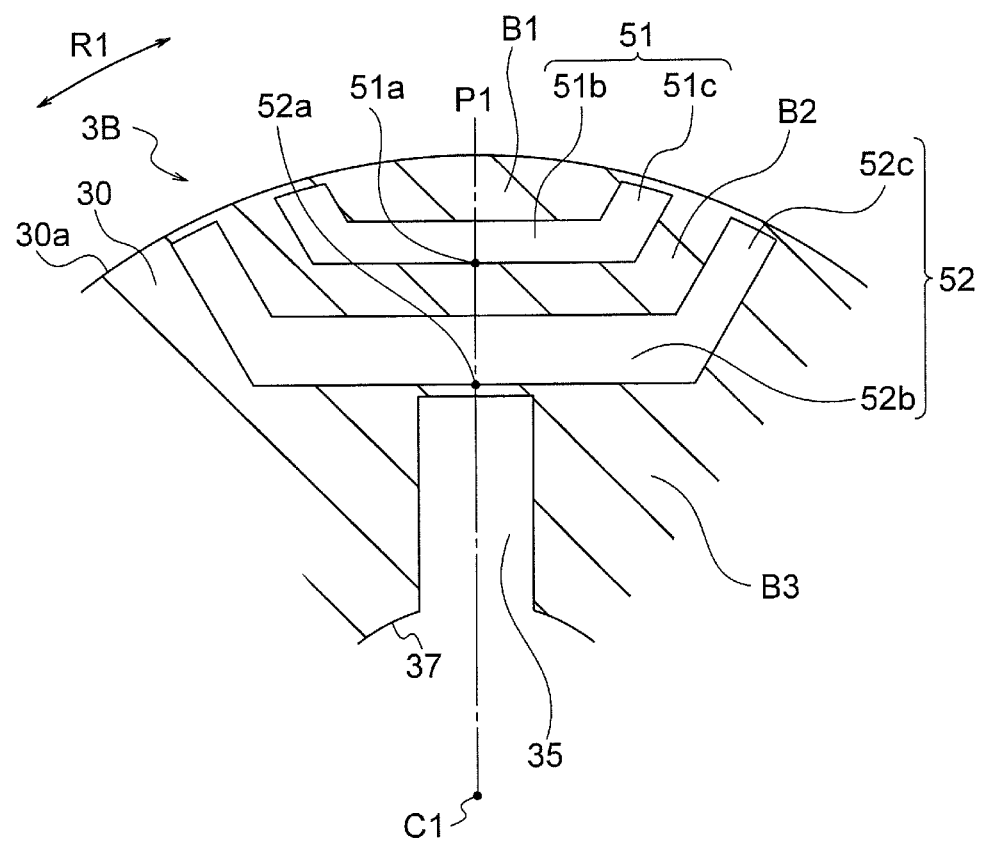
FIG. 18 is an enlarged view illustrating a part of a rotor of the motor of the third embodiment.

FIG. 18 is an enlarged view illustrating a part of the rotor 3B. Each first slit 51 has a first part 51b that includes a center part 51a in the circumferential direction and linearly extends, and a pair of second parts 51c that linearly extend from both ends of the first part 51b in the circumferential direction toward the outer circumference of the rotor core 30. The first part 51b extends in a direction perpendicular to a line (a magnetic-pole center line) in the radial direction which passes through the center part 51a. The pair of second parts 51c extend symmetrically with respect to the line in the radial direction which passes through the center part 51a in such a manner that a distance between the second parts 51c increases outward in the radial direction.

Each second slit 52 has a first part 52b that includes a center part 52a in the circumferential direction and linearly extends, and a pair of second parts 52c that linearly extend from both ends of the first part 52b in the circumferential direction toward the outer circumference of the rotor core 30. The first part 52b extends in a direction perpendicular to a line (a magnetic-pole center line) in the radial direction which passes through the center part 52a. The pair of second parts 52c extend symmetrically with respect to the line in the radial direction which passes through the center part 52a in such a manner that a distance between the second parts 52c increases outward in the radial direction.

The region B1 in which magnetic flux from the stator 1 flows is formed on the outer circumferential side of the first slit 51. The band-shaped region B2 in which magnetic flux from the stator 1 flows is formed between the first slit 51 and the second slit 52. In a region surrounded by the second slits 52 of the magnetic poles, the inner circumferential side region B3 where less magnetic flux flows is formed. Although two slits (the first slit 51 and the second slit 52) are formed in each magnetic pole of the rotor 3B in this example, three or more slits may be formed.

The configurations of the shaft hole 37 and the groove parts 35 of the rotor core 30 are the same as those in the first embodiment. Moreover, the crimping parts 33 and the rivet holes 34 described in the second embodiment may be formed in the inner circumferential side region B3 of the rotor core 30.

As described above, in the third embodiment, the reluctance motor includes the first slit 51 and the second slit 52 in each magnetic pole of the rotor 3B, the winding 2 is wound around the stator core 10 in wave winding, and the cutout parts 16 (refrigerant passages) through which refrigerant flows in the axial direction are formed in the stator core 10. Therefore, it is possible to obtain a high output without increasing the entire size of the motor 100B, as in the first embodiment. Moreover, the winding 2 is wound in wave winding and the outward protruding amount of the winding 2 in the radial direction is small. Therefore, a sufficient flow rate of refrigerant passing through the cutout parts 16 can be obtained.

Furthermore, since the groove parts 35 that pass through the rotor core 30 in the axial direction are formed on the outer side in the radial direction of the shaft hole 37 of the rotor core 30, it is possible to increase a flow rate of refrigerant without obstructing a flow of magnetic flux in the rotor core 30.

Fourth Embodiment

Figure 19:
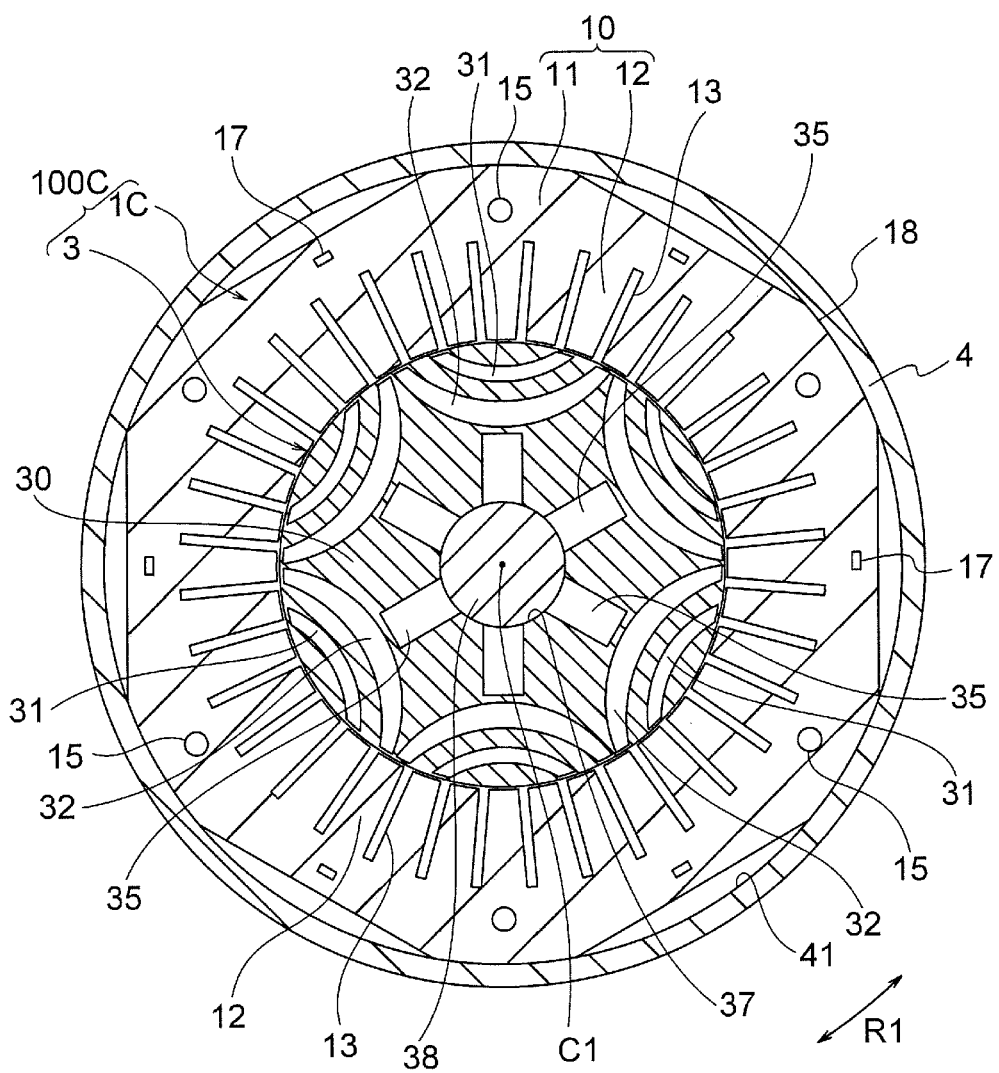
FIG. 19 is a sectional view illustrating a motor of a fourth embodiment.

Next, a fourth embodiment of the present invention is described. FIG. 19 is a sectional view illustrating a configuration of a motor 100C of the fourth embodiment in a plane perpendicular to the axis C1. The motor 100C includes a stator 1C and the rotor 3.

The stator 1C of the motor 100C includes the stator core 10 and the winding 2. The stator core 10 includes the yoke part 11 and the teeth 12, and the winding 2 is wound around the teeth 12 in wave winding, as in the first embodiment. However, through holes 15 (refrigerant passages) through which refrigerant flows in the axial direction are formed in the yoke part 11, in place of the cutout parts 16.

Six through holes 15, the number of which is the same as the pole number P, are formed at equal intervals in the circumferential direction in this example. Each through hole 15 is located, for example, on an axis in the radial direction which passes through the center position of the tooth 12 in the circumferential direction. Moreover, it is desirable that the through holes 15 and the crimping parts 17 of the stator core 10 are formed alternately in the circumferential direction.

Since the winding 2 is wound around the teeth 12 in wave winding, the outward protruding amount of the winding 2 in the radial direction is small, and thus the winding 2 does not obstruct a flow of refrigerant passing through the through holes 15. Therefore, a sufficient flow rate of refrigerant can be obtained. The cutout parts 16 (FIG. 1) described in the first embodiment may be formed in the yoke part 11 in addition to the through holes 15. The number of the through holes 15 is not limited to the same number as the pole number P, and it is sufficient that the number of the through holes 15 is one or more.

The rotor 3 of the motor 100C has the same configuration as the rotor 3 of the first embodiment. However, the crimping parts 33 and the rivet holes 34 may be formed in the rotor 3 as described in the second embodiment, or the shapes of the slits 51 and 52 described in the third embodiment may be employed.

As described above, in this fourth embodiment, the through holes 15 through which refrigerant passes are formed in the yoke part 11 of the stator 1C, and the winding 2 is wound around the teeth 12 in wave winding. Therefore, a flow of refrigerant passing through the through holes 15 is not obstructed by the winding 2, so that a sufficient flow rate of refrigerant can be obtained. Moreover, by providing both of the through holes 15 and the cutout parts 16 in the yoke part 11 of the stator 1C, the flow rate of refrigerant can be further increased.

(Compressor)

Figure 20:
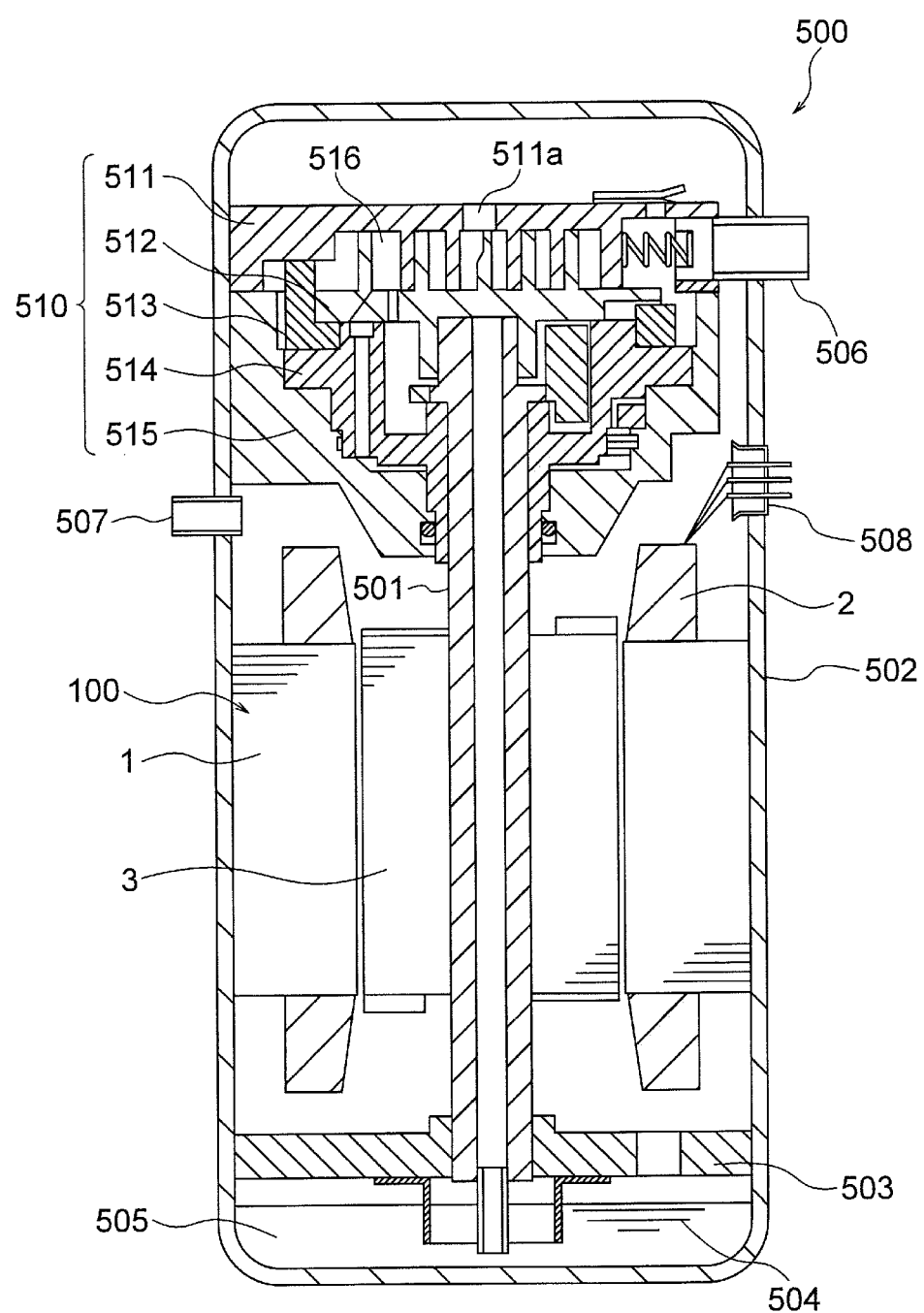
FIG. 20 is a vertical sectional view illustrating a compressor to which the motor of each of the embodiments is applicable.

Next, a compressor in which the motor 100 of the above described first embodiment is used will be described. FIG. 20 is a sectional view illustrating a configuration of the compressor (scroll compressor) 500 in which the motor 100 of the above described first embodiment is used.

The compressor 500 is a scroll compressor and includes, in a closed container 502, a compression mechanism 510, the motor 100 that drives the compression mechanism 510, a main shaft 501 that connects the compression mechanism 510 and the motor 100 to each other, a sub-frame 503 that supports an end (a sub-shaft part) of the main shaft 501 opposite to the compression mechanism 510, and a lubricant 504 stored in an oil reservoir 505 at a bottom of the closed container 502.

The compression mechanism 510 has a fixed scroll 511 and an orbiting scroll 512 attached to the main shaft 501. Each of the fixed scroll 511 and the orbiting scroll 512 has a spiral part, and a spiral compression chamber 516 is formed between the fixed scroll 511 and the orbiting scroll 512. The compression mechanism 510 further includes an Oldham ring 513 that regulates rotation of the orbiting scroll 512 to make the orbiting scroll 512 swing, a compliant frame 514 to which the orbiting scroll 512 is attached, and a guide frame 515 that supports these components.

A suction pipe 506 passing through the closed container 502 is press-fitted to the fixed scroll 511. Moreover, a discharge pipe 507 is provided so as to pass through the closed container 502. The discharge pipe 507 allows high-pressure refrigerant gas discharged from a discharge port 511a of the fixed scroll 511 to be discharged to the outside.

The closed container 502 includes the cylindrical shell 4 (FIG. 1). The motor 100 of the first embodiment is attached to the inner circumferential side of the shell 4. A glass terminal 508 for electrically connecting the stator 1 of the motor 100 and a driving circuit to each other is fixed to the closed container 502 by welding. The main shaft 501 is the shaft 38 of the motor 100 (FIG. 1).

An operation of the compressor 500 is as follows. When the motor 100 rotates, the main shaft 501 (the shaft 38) rotates together with the rotor 3. When the main shaft 501 rotates, the orbiting scroll 512 swings to change a volume of the compression chamber 516 between the fixed scroll 511 and the orbiting scroll 512. Thus, refrigerant gas is sucked through the suction pipe 506 into the compression chamber 516 and is compressed.

The high-pressure refrigerant gas compressed in the compression chamber 516 is discharged into the closed container 502 through the discharge port 511a of the fixed scroll 511, and is discharged to the outside through the discharge pipe 507. Moreover, part of the refrigerant gas discharged into the closed container 502 from the compression chamber 516 passes through the cutout parts 16 of the stator 1 (FIG. 1) and cools the motor 100 and the lubricant 504.

As described above, the motor 100 of the first embodiment generates high torque and manufacturing cost of the motor 100 is low. Therefore, an output of the compressor 500 can be increased and manufacturing cost of the compressor 500 can be reduced.

In place of the motor 100, any of the motors 100A to 100C described in the second to fourth embodiments may be used in the compressor 500. Although a scroll compressor has been described here as an example of a compressor, the motors 100 to 100C of the first to fourth embodiments may be applied to a compressor other than a scroll compressor.

(Air Conditioner)

Figure 21:
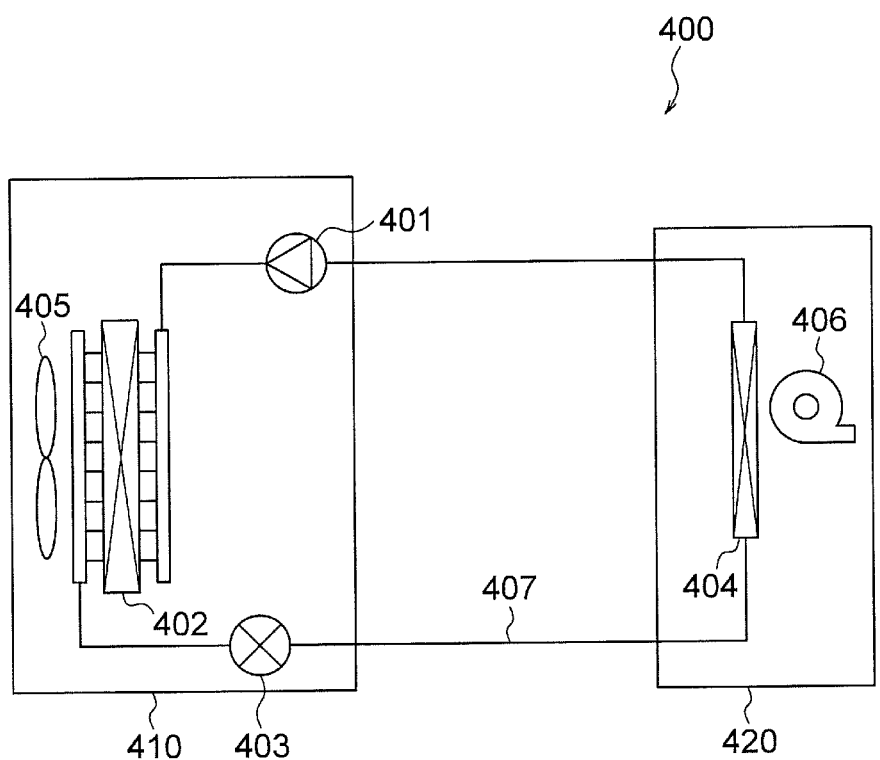
FIG. 21 is a diagram illustrating an air conditioner including the compressor of FIG. 20.

Next, an air conditioner (a refrigerating cycle apparatus) including the compressor 500 illustrated in FIG. 20 will be described. FIG. 21 is a diagram illustrating a configuration of an air conditioner 400. The air conditioner 400 illustrated in FIG. 21 includes a compressor 401, a condenser 402, a restrictor (a decompressor) 403, and an evaporator 404. The compressor 401, the condenser 402, the restrictor 403, and the evaporator 404 are connected by a refrigerant pipe 407 to constitute a refrigerating cycle. That is, refrigerant circulates through the compressor 401, the condenser 402, the restrictor 403, and the evaporator 404 in this order.

The compressor 401, the condenser 402, and the restrictor 403 are provided in an outdoor unit 410. The compressor 401 is constituted by the compressor 500 illustrated in FIG. 20. An outdoor fan 405 for supplying outdoor air to the condenser 402 is provided in the outdoor unit 410. The evaporator 404 is provided in an indoor unit 420. An indoor fan 406 for supplying indoor air to the evaporator 404 is provided in the indoor unit 420.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air, condenses and liquefies the refrigerant, and sends out the liquefied refrigerant to the refrigerant pipe 407. The outdoor fan 405 supplies the outdoor air to the condenser 402. The restrictor 403 changes its opening degree to thereby adjust a pressure or the like of the refrigerant flowing through the refrigerant pipe 407.

The evaporator 404 exchanges heat between the refrigerant brought into a low pressure state by the restrictor 403 and the indoor air, causes the refrigerant to take heat from the air and evaporate (vaporize), and sends out the refrigerant to the refrigerant pipe 407. The indoor fan 406 supplies the indoor air to the evaporator 404. Thus, cool wind deprived of heat by the evaporator 404 is supplied into a room.

Since any of the motors 100 to 100C described in the first to fourth embodiments is applicable to the compressor 401 (the compressor 500 in FIG. 20), air conditioning performance of the air conditioner 400 can be increased and manufacturing cost of the air conditioner 400 can be reduced.

The compressor 500 to which any of the motors 100 to 100C of the first to fourth embodiments is applied is not limited to use in the air conditioner 400 illustrated in FIG. 21. The compressor 500 may be used in another type of air conditioner.

Although the preferred embodiments of the present invention have been described specifically, the present invention is not limited to the above described embodiments, and various improvements or modifications can be made within a range not departing from the gist of the present invention.

What is claimed is:

1. A reluctance motor used in a compressor, comprising:
a rotor having a rotor core that has an annular outer circumference about an axis, having a plurality of magnetic poles along the outer circumference, and having no permanent magnet; and
a stator having a stator core that surrounds the rotor from an outer side in a radial direction about the axis and a winding wound around the stator core in wave winding,
wherein each of the plurality of magnetic poles has a first slit formed in the rotor core and a second slit formed on an inner side of the first slit in the radial direction,
wherein a cutout part is provided on an outer circumference of the stator core, the cutout part constituting a refrigerant passage through which refrigerant passes in a direction of the axis,
wherein the rotor core has a shaft hole formed at a center in the radial direction, and a set of groove parts each of which extends in the radial direction from the shaft hole toward a center of the second slit in a circumferential direction about the axis, and
wherein the rotor core has a crimping part between two of the second slits adjacent to each other, and a through hole between two of the groove parts adjacent to each other.

2. The reluctance motor according to claim 1, wherein the rotor core has groove parts including the groove part, and a number of the groove parts is equal to a number of the plurality of magnetic poles.

3. The reluctance motor according to claim 1, wherein the rotor core has a plurality of crimping parts including the crimping part, and a number of the plurality of crimping parts is equal to a number of the plurality of magnetic poles.

4. The reluctance motor according to claim 1, wherein the rotor core has a through hole on an inner side of the crimping part in the radial direction, and the through hole passes through the rotor core in the direction of the axis.

5. The reluctance motor according to claim 4, wherein the through hole is located between adjacent two of the plurality of magnetic poles.

6. The reluctance motor according to claim 4, wherein the rotor core has a plurality of through holes including the through hole, and a number of the plurality of through holes is equal to a number of the plurality of magnetic poles.

7. The reluctance motor according to claim 1, wherein each of the first slit and the second slit has an arc shape such that a center part in a circumferential direction about the axis protrudes inward in the radial direction with respect to both end parts in the circumferential direction.

8. The reluctance motor according to claim 1, wherein each of the first slit and the second slit has a first part and a pair of second parts, the first part including a center part in the circumferential direction about the axis and extending linearly, the second parts extending linearly from both ends in the circumferential direction of the first part toward the outer circumference of the rotor.

9. The reluctance motor according to claim 1, wherein the cutout part is formed over an entire region of the stator core in the direction of the axis on the outer circumference of the stator core.

10. The reluctance motor according to claim 1, further comprising a through hole that passes through the stator core in the direction of the axis, and the through hole allows refrigerant to pass in the direction of the axis.

11. The reluctance motor according to claim 1, wherein the winding has a cover layer of polyesterimide or polyamideimide.

12. A compressor comprising:
the reluctance motor according to claim 1; and
a compression mechanism driven by the reluctance motor.

13. The compressor according to claim 12, further comprising a cylindrical shell,
wherein the stator core is fitted into the shell.

14. An air conditioner comprising a compressor, a condenser, a decompressor, and an evaporator,
wherein the compressor comprises the reluctance motor according to claim 1 and a compression mechanism driven by the reluctance motor.

* * * * *